United States Patent
Li et al.

(10) Patent No.: US 12,418,245 B1
(45) Date of Patent: Sep. 16, 2025

(54) METHOD AND SYSTEM FOR COOPERATIVELY SUPPRESSING COMMON-MODE VOLTAGE AND CURRENT HARMONICS OF COUPLED THREE-LEVEL INVERTER

(71) Applicant: SHANDONG JIANZHU UNIVERSITY, Jinan (CN)

(72) Inventors: Xiaoyan Li, Jinan (CN); Changwei Qin, Jinan (CN); Chengdong Li, Jinan (CN); Han Xu, Jinan (CN); Zhiyuan Chu, Jinan (CN); Chuanjing Hou, Jinan (CN); Hongchao Bai, Jinan (CN); Dongjiang Yang, Jinan (CN); Lei Yang, Jinan (CN)

(73) Assignee: SHANDONG JIANZHU UNIVERSITY, Jinan (CN)

( * ) Notice: Subject to any disclaimer, the term of this patent is extended or adjusted under 35 U.S.C. 154(b) by 0 days.

(21) Appl. No.: 19/189,360

(22) Filed: Apr. 25, 2025

(30) Foreign Application Priority Data

May 24, 2024 (CN) .......................... 202410654750.4

(51) Int. Cl.
*H02M 7/483* (2007.01)
*H02M 1/12* (2006.01)

(52) U.S. Cl.
CPC ......... *H02M 7/4833* (2021.05); *H02M 1/123* (2021.05)

(58) Field of Classification Search
CPC ........... H02M 7/4833; H02M 7/53875; H02M 7/483; H02M 1/123
See application file for complete search history.

(56) References Cited

U.S. PATENT DOCUMENTS 9,871,436 B1 * 1/2018 Jiao ...................... H02M 7/487
9,979,319 B1 * 5/2018 Jiao ...................... H02M 1/32
(Continued)

FOREIGN PATENT DOCUMENTS

CN 103580465 B * 11/2015
CN 109787498 A * 5/2019 ............ H02M 7/487
(Continued)

OTHER PUBLICATIONS

Machine translation CN-109217701-B (Year: 2020).*
(Continued)

*Primary Examiner* — Thienvu V Tran
*Assistant Examiner* — Yahveh Comas Torres
(74) *Attorney, Agent, or Firm* — IPro, PLLC; Na Xu

(57) ABSTRACT

The present invention provides a method for cooperatively suppressing a common-mode voltage and current harmonics of coupled three-level inverters, comprising: based on amplitude and phase angle of reference voltage vector, determining sector and region in which the reference voltage vector is located; selecting four basic voltage vectors with low common-mode voltage amplitudes to synthesize the reference voltage vector; writing volt-second balance equation based on selected basic voltage vectors, and calculating duty cycles thereof; and based on sector and region in which reference voltage vector is located, set value of voltage difference across capacitors on direct current side, and actual value of voltage difference across capacitors on direct current side, (1) updating duty cycles of basic voltage vectors, to realize separate control of capacitor voltage; and (2) designing and converting switching sequence into PWM drive signal of power switch, to control the coupled three-level inverter to operate.

10 Claims, 19 Drawing Sheets

(56) References Cited

U.S. PATENT DOCUMENTS

| | | | |
|---|---|---|---|
| 12,184,160 B2 * | 12/2024 | Qin | H02M 7/5395 |
| 2008/0298103 A1 * | 12/2008 | Bendre | H02M 7/487 |
| | | | 363/97 |
| 2009/0295229 A1 * | 12/2009 | Harke | H02M 7/217 |
| | | | 307/75 |
| 2014/0009988 A1 * | 1/2014 | Valiani | H02M 7/487 |
| | | | 363/131 |

FOREIGN PATENT DOCUMENTS

| | | | | |
|---|---|---|---|---|
| CN | 109450280 B | * | 9/2019 | H02M 7/219 |
| CN | 109787498 B | * | 10/2019 | H02M 7/487 |
| CN | 109217701 B | * | 1/2020 | H02M 7/219 |
| CN | 110112945 B | * | 7/2020 | H02M 7/487 |
| CN | 113285583 A | | 8/2021 | |
| CN | 113422534 A | * | 9/2021 | H02J 3/28 |
| CN | 114649968 A | * | 6/2022 | H02M 1/12 |
| CN | 114884383 A | * | 8/2022 | H02M 7/53873 |
| CN | 115459568 A | | 12/2022 | |
| CN | 116961381 A | * | 10/2023 | H02M 1/08 |
| CN | 117543934 A | * | 2/2024 | H02M 1/0054 |
| EP | 4084309 A1 | * | 11/2022 | H02M 7/493 |

OTHER PUBLICATIONS

Machine translation CN-110112945-B (Year: 2020).*
Machine translation CN-117543934-A (Year: 2024).*
Machine translation CN-109787498-B (Year: 2019).*
Machine translation CN-109450280-B (Year: 2019).*
Machine translation CN-109787498-A (Year: 2019).*
Machine translation CN-103580465-B (Year: 2015).*
Machine translation CN-113422534-A (Year: 2023).*
Machine translation CN-116961381-A (Year: 2023).*
Machine translation CN-114649968-A (Year: 2022).*
Machine translation CN-114884383-A (Year: 2022).*
Qin, Changwei et al., "Research on Three-level SHEPWM Method Based on MOPSO", Power Electronics, vol. 49, No. 6, Jun. 30, 2015.

* cited by examiner

Low-cost three-level inverter

METHOD AND SYSTEM FOR COOPERATIVELY SUPPRESSING COMMON-MODE VOLTAGE AND CURRENT HARMONICS OF COUPLED THREE-LEVEL INVERTER

CROSS-REFERENCE TO RELATED APPLICATIONS

The present invention claims priority to Chinese Patent Application No. 202410654750.4, filed with the China National Intellectual Property Administration on May 24, 2024 and entitled "METHOD AND SYSTEM FOR COOPERATIVELY SUPPRESSING COMMON-MODE VOLTAGE AND CURRENT HARMONICS OF COUPLED THREE-LEVEL INVERTER", which is incorporated herein by reference in its entirety and constitutes a part of the present invention, for all purposes.

TECHNICAL FIELD

The present invention belongs to the technical field of power transactions on power electronics, and specifically to a method and a system for cooperatively suppressing a common-mode voltage and current harmonics of a coupled three-level inverter.

BACKGROUND

The description in this section merely provides background information related to the present invention and does not necessarily constitute the prior art.

Due to the advantages of low voltage stress of a power switch and good system output waveform quality, the three-level inverter is widely used in the field such as photovoltaic power generation, hybrid energy storage, and motor drives. The neutral-point clamped (NPC) and T-type three-level inverters are two most commonly-used circuit topologies, but there is still a limitation of a large quantity of power switches. The coupled three-level inverter uses a relatively small quantity of power switches, to reduce system costs and maintain a multi-level output function, and has a wide application prospect.

The common-mode voltage (CMV) is generated by a high-frequency switching action of the power switch, which leads to a leakage current in a photovoltaic power generation system, causes distortion of an output current and a power loss of the inverter, and even threatens the safety of human beings. A common-mode leakage current generated in a high-power electric drive system continuously flows through motor insulation, causing severe damage to the motor. In addition, a bearing current is generated, which damages a bearing of the motor and increases system electromagnetic interference.

The inventor finds that the existing common-mode voltage suppression method is mainly for an operating condition in which two capacitor voltages on a direct current side of the coupled three-level inverter are equal. When the coupled three-level inverter operates in an operating condition in which the capacitor voltages on the direct current side are not equal, output current harmonics of the coupled three-level inverter increase. In addition, an output state of the topology is limited, and a medium vector cannot be generated. Therefore, the existing control method cannot be directly applied, and a method that is for cooperatively suppressing a common-mode voltage and current harmonics and that is applicable to unbalanced neutral-point voltages on a direct current side is urgently to be studied.

SUMMARY

To resolve the foregoing problem, the present invention provides a method and a system for cooperatively suppressing a common-mode voltage and current harmonics of a coupled three-level inverter. The present invention can realize common-mode voltage suppression of the coupled three-level inverter on a condition of unbalanced capacitor voltages on a direct current side while maintaining good waveform quality of an output current, and is applicable to a case in which the capacitor voltages on the direct current side are balanced.

According to some embodiments, a first solution of the present invention provides a method for cooperatively suppressing a common-mode voltage and current harmonics of a coupled three-level inverter, and the following technical solutions are used.

The method for cooperatively suppressing the common-mode voltage and current harmonics of the coupled three-level inverter, including:
  determining, based on an amplitude and a phase angle of a reference voltage vector, a sector and a region in which the reference voltage vector is located;
  selecting, based on the sector and the region in which the reference voltage vector is located, a set value of a voltage difference across capacitors on a direct current side, and an actual value of the voltage difference across capacitors on the direct current side, four basic voltage vectors with low common-mode voltage amplitudes to synthesize the reference voltage vector;
  writing a volt-second balance equation based on the selected basic voltage vectors, and calculating duty cycles of the basic voltage vectors by using an indirect method;
  updating the duty cycles of the basic voltage vectors based on the sector and the region in which the reference voltage vector is located, the set value of the voltage difference across capacitors on the direct current side, and the actual value of the voltage difference across capacitors on the direct current side, to realize separate control of the capacitor voltage; and
  designing a switching sequence based on the sector and the region in which the reference voltage vector is located, the set value of the voltage difference across capacitors on the direct current side, and the actual value of the voltage difference across capacitors on the direct current side, and converting the switching sequence into a PWM (Pulse-width Modulation) drive signal of a power switch, to control the coupled three-level inverter to operate.

According to some embodiments, a second solution of the present invention provides a system for cooperatively suppressing a common-mode voltage and current harmonics of a coupled three-level inverter, and the following technical solutions are used.

The system for cooperatively suppressing the common-mode voltage and current harmonics of the coupled three-level inverter, including:
  a sector determining module, configured to determine, based on an amplitude and a phase angle of a reference voltage vector, a sector and a region in which the reference voltage vector is located;
  a basic voltage vector selection module, configured to select, based on the sector and the region in which the reference voltage vector is located, a set value of a voltage difference across capacitors on a direct current side, and an actual value of the voltage difference across capacitors on the direct current side, four basic voltage vectors with low common-mode voltage amplitudes to synthesize the reference voltage vector;

a basic voltage vector duty cycle calculation module, configured to write a volt-second balance equation based on the selected basic voltage vectors, and calculating duty cycles of the basic voltage vectors by using an indirect method;

a capacitor voltage separate control module, configured to update the duty cycles of the basic voltage vectors based on the sector and the region in which the reference voltage vector is located, the set value of the voltage difference across capacitors on the direct current side, and the actual value of the voltage difference across capacitors on the direct current side, to realize separate control of the capacitor voltage; and a drive signal generation module, configured to design a switching sequence based on the sector and the region in which the reference voltage vector is located, the set value of the voltage difference across capacitors on the direct current side, and the actual value of the voltage difference across capacitors on the direct current side, and convert the switching sequence into a PWM drive signal of a power switch, to control the coupled three-level inverter to operate.

According to some embodiments, a third solution of the present invention provides a computer-readable storage medium.

A computer-readable storage medium, having a computer program stored thereon, wherein when the program is executed by a processor, causing the process to implement steps of the method for cooperatively suppressing the common-mode voltage and current harmonics of the coupled three-level inverter according to the first aspect.

According to some embodiments, a fourth solution of the present invention provides a computer device.

A computer device, including a memory, a processor, and a computer program stored in the memory and capable of running on the processor, wherein when the processor executes the program, causing the process to implement steps of the method for cooperatively suppressing the common-mode voltage and current harmonics of the coupled three-level inverter according to the first aspect.

The beneficial effects of the present invention compared with the prior art are as follows:

Compared with a conventional common-mode voltage suppression method, the method according to the present invention eliminates even harmonics caused by unbalanced capacitor voltages on the direct current side of the coupled three-level inverter, and reduces a total harmonic distortion of a three-phase output current. In operating conditions of balanced capacitor voltages and unbalanced capacitor voltages on the direct current side, the method according to the present invention can effectively suppress the common-mode voltage of the coupled three-level inverter and maintain a high-quality output current. Compared with a conventional virtual vector modulation method and a conventional space vector modulation method, the method according to the present invention enables the common-mode voltage of the coupled three-level inverter to be effectively suppressed. In the present invention, the duty cycles of the basic voltage vectors are modified based on different sectors and regions, a set value ($V_{diff}^*$) of a capacitor voltage, and a voltage difference ($V_{diff}$) across two capacitors on the direct current side, to realize separate control of the capacitor voltage on the direct current side.

Advantages of additional aspects of the present invention will be partly set forth in the following description, and will become apparent in part from the following description, or may be learned from practice of the present invention.

BRIEF DESCRIPTION OF THE DRAWINGS

The accompanying drawings constituting a part of the present invention are used to provide a further understanding of the present invention. The illustrative embodiments of the present invention and descriptions thereof are used to explain the present invention, and do not constitute an improper limitation of the present invention.

DETAILED DESCRIPTION

Figure 1:
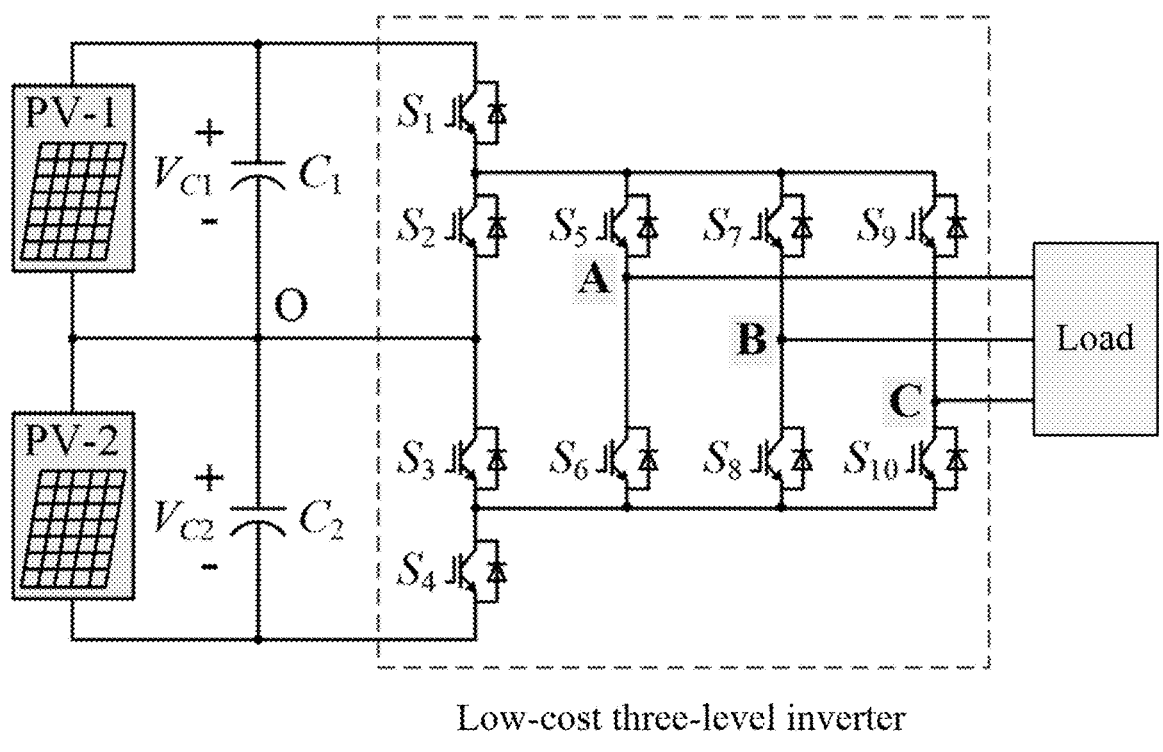
FIG. 1 is a circuit topology diagram of a coupled three-level inverter.

The present invention is further explained with reference to the accompanying drawings and the embodiments.

It should be pointed out that the following detailed descriptions are all illustrative and are intended to provide further descriptions of the present invention. Unless otherwise specified, all technical and scientific terms used in this specification have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

The embodiments in the present invention and features in the embodiments may be combined with each other if there is no conflict.

Example 1

The present example provides a method for cooperatively suppressing a common-mode voltage and current harmonics of a coupled three-level inverter. In the present example, the method includes:

determining, based on an amplitude and a phase angle of a reference voltage vector, a sector and a region in which the reference voltage vector is located;

selecting, based on the sector and the region in which the reference voltage vector is located, a set value of a voltage difference across capacitors on a direct current side, and an actual value of the voltage difference across capacitors on the direct current side, four basic voltage vectors with low common-mode voltage amplitudes to synthesize the reference voltage vector;

writing a volt-second balance equation based on the selected basic voltage vectors, and calculating duty cycles of the basic voltage vectors by using an indirect method;

updating the duty cycles of the basic voltage vectors based on the sector and the region in which the reference voltage vector is located, the set value of the voltage difference across capacitors on the direct current side, and the actual value of the voltage difference across capacitors on the direct current side, to realize separate control of the capacitor voltage; and designing a switching sequence based on the sector and the region in which the reference voltage vector is located, the set value of the voltage difference across capacitors on the direct current side, and the actual value of the voltage difference across capacitors on the direct current side, and converting the switching sequence into a PWM drive signal of a power switch, to control the coupled three-level inverter to operate.

The writing a volt-second balance equation based on the selected basic voltage vector, and calculating a duty cycle of the basic voltage vector by using an indirect method is specifically:

when the reference voltage vector is located in the region A of each sector, selecting four nearest basic voltage vectors to construct the volt-second balance equation;

when the reference voltage vector is located in the region A of each sector, determining, by using a duty cycle of a small vector as a solved value, duty cycles of other three basic voltage vectors by using the indirect method;

when the reference voltage vector is located in the region B of each sector, selecting one large vector, two small vectors, and one zero vector, to construct the volt-second balance equation; and when the reference voltage vector is located in the region B of each sector, simplifying the volt-second balance equation, and determining, by using a duty cycle of the large vector as a solved value, duty cycles of other three vectors by using the indirect method.

The updating the duty cycle of the basic voltage vector based on the sector and the region in which the reference voltage vector is located, the set value of the voltage difference across capacitors on the direct current side, and the actual value of the voltage difference across capacitors on the direct current side, to realize separate control of the capacitor voltage includes:

sending a difference between the set value of the voltage difference across capacitors on the direct current side and the actual value of the voltage difference across capacitors on the direct current side to a PI controller, and performing an absolute value operation on an output of the PI controller, to obtain a duty cycle allocation factor modifying value of the basic voltage vector; and updating the duty cycle of the basic voltage vector based on the sector and the region in which the reference voltage vector is located, and a value of the difference between the set value of the voltage difference across capacitors on the direct current side and the actual value of the voltage difference across capacitors on the direct current side.

A system structure of the coupled three-level inverter is shown in FIG. 1. The system includes two photovoltaic arrays, direct current side capacitors ($C_1$ and $C_2$), the coupled three-level inverter, and a load. One photovoltaic array is connected at both ends of each direct current side capacitor, to further design a system control strategy, implement separate maximum power point tracking (MPPT) functions of the two photovoltaic arrays, effectively overcome efficiency reduction caused by component power mismatch and partial shadow, and further improve system efficiency and power generation capacity.

The power switch is an insulated-gate bipolar transistor (IGBT). The power switch may also be implemented by using a transistor in another form, and may be specifically selected according to an actual requirement of a person skilled in the art.

Similar to a conventional three-level inverter, there are three switch states of the coupled three-level inverter: P, O, and N. A neutral point O (see FIG. 1) on the direct current side is selected as a reference. When the switch state is P, an output voltage of a bridge arm is $+V_{C1}$; when the switch state is O, the output voltage of the bridge arm is 0; and when the switch state is N, the output voltage of the bridge arm is $-V_{C2}$.

For ease of analysis, a direct current side unbalancing factor φ is defined as follows:

$$\varphi = \frac{V_{C1} - V_{C2}}{V_{C1} + V_{C2}} = \frac{V_{diff}}{V_{dc}}; \quad (1)$$

where, $V_{C1}$ and $V_{C2}$ are voltages at both ends of an upper-side capacitor and a lower-side capacitor respectively, $V_{diff}$ is a voltage difference across two capacitors on the direct current side (that is, $V_{diff}=V_{C1}-V_{C2}$), and Vac is a sum of two capacitor voltages on the direct current side.

Based on Equation (1), it may be obtained that expressions of the upper-side capacitor voltage and the lower-side capacitor voltage on the direct current side are as follows:

$$\begin{cases} V_{C1} = \frac{1+\varphi}{2} V_{dc} \\ V_{C2} = \frac{1-\varphi}{2} V_{dc} \end{cases}; \quad (2)$$

the common-mode voltage is defined as an average value of three-phase output voltages, that is:

$$v_{cm} = \frac{v_{ao} + v_{bo} + v_{co}}{3} \quad (3)$$

where, $v_{cm}$ is the common-mode voltage, and $v_{ao}$, $v_{bo}$, and $v_{co}$ are the three-phase output voltages of the coupled three-level inverter.

Table 1 shows basic voltage vector and common-mode voltage amplitude of a coupled three-level inverter. Apparently, the small vector and the zero vector include basic voltage vectors with high common-mode voltage amplitudes, which are respectively [PPO], [OPP], [POP], [ONN], [NON], [NNO], [PPP], and [NNN]. Therefore, when a modulation method is designed, a system common-mode voltage can be suppressed by discarding the foregoing basic voltage vectors with the high common-mode voltage amplitudes.

TABLE 1

Basic voltage vectors and common-mode voltages of a coupled three-level inverter

| Vector | Switch state | CMV | Switch state | CMV |
|---|---|---|---|---|
| Large vector | [PNN] | $(V_{C1} - 2V_{C2})/3$ | [NPP] | $(2V_{C1} - V_{C2})/3$ |
|  | [PPN] | $(2V_{C1} - V_{C2})/3$ | [NNP] | $(V_{C1} - 2V_{C2})/3$ |
|  | [NPN] | $(V_{C1} - 2V_{C2})/3$ | [PNP] | $(2V_{C1} - V_{C2})/3$ |
| P-type small vector | [POO] | $V_{C1}/3$ | [PPO] | $2V_{C1}/3$ |
|  | [OPO] | $V_{C1}/3$ | [OPP] | $V_{C1}/3$ |
|  | [OOP] | $V_{C1}/3$ | [POP] | $2V_{C1}/3$ |
| N-type small vector | [ONN] | $-2V_{C2}/3$ | [OON] | $-V_{C2}/3$ |
|  | [NON] | $-2V_{C2}/3$ | [NOO] | $-V_{C2}/3$ |
|  | [NNO] | $-2V_{C2}/3$ | [ONO] | $-V_{C2}/3$ |
| Zero vector | [PPP] [NNN] | $V_{C1}$ $-V_{C2}$ | [OOO] | 0 |

Figure 2:
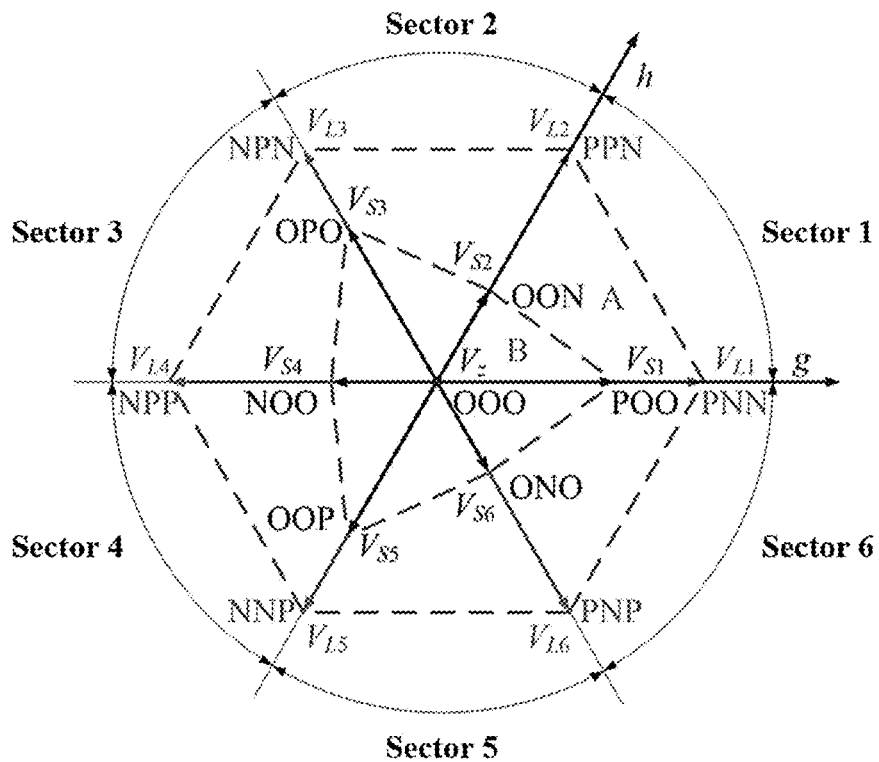
FIG. 2 is a space vector diagram of a coupled three-level inverter when a direct current side unbalancing factor is greater than 0.
Figure 3:
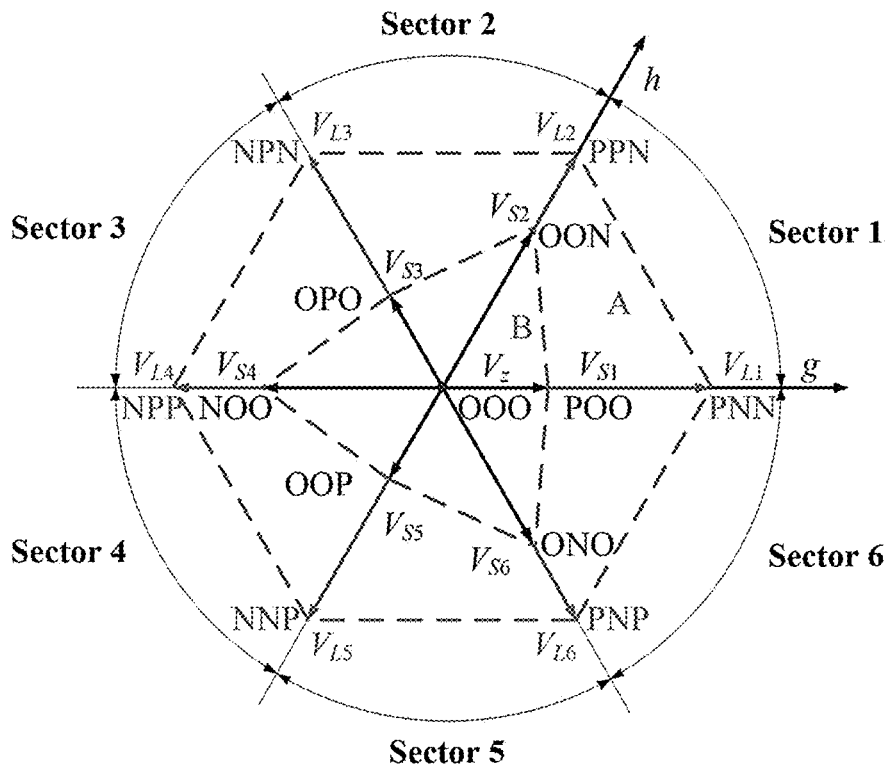
FIG. 3 is a space vector diagram of a coupled three-level inverter when a direct current side unbalancing factor is less than 0.

FIG. 2 and FIG. 3 are space vector diagrams of a coupled three-level inverter when a direct current side unbalancing factor is greater than or less than 0. The entire space vector diagram is divided into 6 sectors (that is, a sector 1 to a sector 6), and each sector is further divided into two small regions (that is, a region A and a region B). It can be seen that, in an operating condition of unbalanced neutral-point voltages on a direct current side, locations of the large vector and the zero vector remain unchanged, that is, are the same as those in an operating condition of balanced neutral-point voltages; and A location of the small vector is shifted, and the small vector is no longer redundant, which makes the implementation process of the space vector modulation method extremely complicated.

Figure 4:
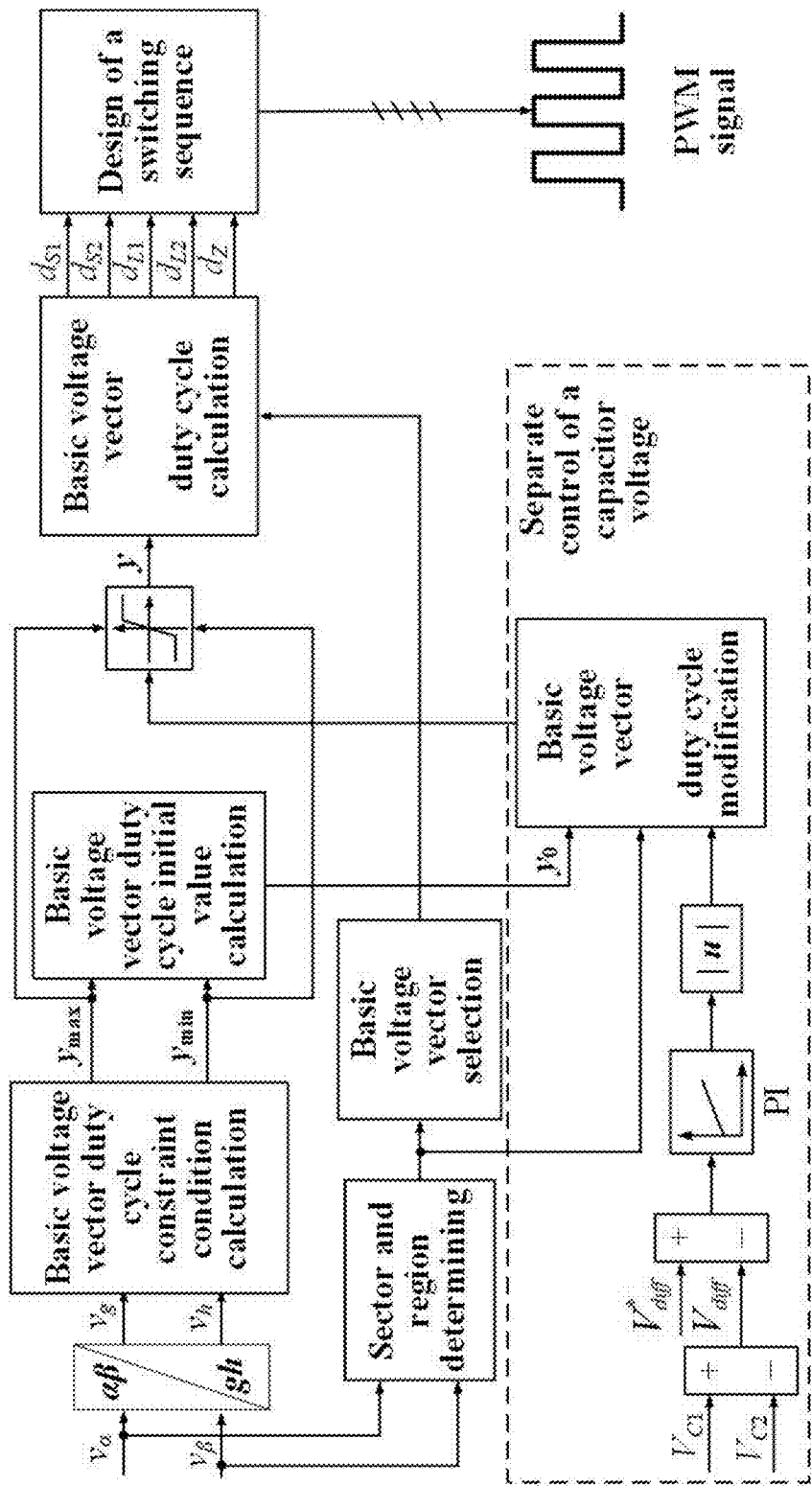
FIG. 4 is a block diagram of a method for cooperatively suppressing a common-mode voltage and current harmonics of a coupled three-level inverter according to Example 1 of the present invention.

FIG. 4 is a control block diagram of a method according to the present invention. To achieve objectives such as common-mode voltage suppression, separate control of a capacitor voltage on a direct current side, and low-harmonic control of an output current, a control method is designed, and specifically includes:

1. Determination of the Sector in which the Reference Voltage Vector is Located

Determine, based on amplitude and a phase angle of a reference voltage vector, a sector and a region in which the reference voltage vector is located.

2. Selection of the Basic Voltage Vector

Basic voltage vectors in the sector 1 include a small vector $V_{S1}$ [POO], a small vector $V_{S2}$ [OON], a large vector $V_{L1}$ [PNN], a large vector $V_{L2}$ [PPN], and a zero vector $V_Z$ [OOO], and an expression of each basic voltage vector is as follows:

$$\begin{cases} V_{S1} = \dfrac{1+\varphi}{3} V_{dc} \cdot e^{j0} \\ V_{S2} = \dfrac{1+\varphi}{3} V_{dc} \cdot e^{j\frac{\pi}{3}} \\ V_{L1} = \dfrac{2}{3} V_{dc} \cdot e^{j0} \\ V_{L2} = \dfrac{2}{3} V_{dc} \cdot e^{j\frac{\pi}{3}} \\ V_Z = 0 \end{cases} \quad (4)$$

When the reference voltage vector is located in the region A of each sector, four nearest basic voltage vectors are used to synthesize the reference voltage vector. When the reference voltage vector is located in the region B of each sector, separate control of a capacitor voltage on the direct current side cannot be realized by using the basic voltage vectors selected according to a nearest three-vector principle. Therefore, in the method according to the present invention, a large vector is additionally selected to synthesize the reference voltage vector, to generate a new degree of control freedom for separate control of the capacitor voltage on the direct current side. Table 2 shows basic voltage vectors selected from different sectors and regions.

TABLE 2

Basic voltage vectors selected from different regions of each sector

| Sector | Region A | Region B |
|---|---|---|
| 1 | [PNN], [PPN], [POO], [OON] | [PNN], [PPN], [POO], [OON], [OOO] |
| 2 | [PPN], [NPN], [OON], [OPO] | [PPN], [NPN], [OON], [OPO], [OOO] |
| 3 | [NPN], [NPP], [OPO], [NOO] | [NPN], [NPP], [OPO], [NOO], [OOO] |
| 4 | [NPP], [NNP], [NOO], [OOP] | [NPP], [NNP], [NOO], [OOP], [OOO] |
| 5 | [NNP], [PNP], [OOP], [ONO] | [PNP], [PNN], [ONO], [POO], [OOO] |
| 6 | [PNP], [PNN], [ONO], [POO] | [PNP], [PNN], [ONO], [POO], [OOO] |

3. Calculation of the Duty Cycle

To simplify calculation, a non-orthogonal gh coordinate system is established. $v_g$ and $v_h$ are g-axis and h-axis components of the reference voltage vector, which are expressed as follows:

$$\begin{cases} v_g = v_\alpha - \dfrac{\sqrt{3}}{3} v_\beta \\ v_h = \dfrac{2\sqrt{3}}{3} v_\beta \end{cases} \quad (5)$$

where, $v_\alpha$ and $v_\beta$ are a-axis and b-axis components of the reference voltage vector.

The sector 1 is used as an example, and a method for calculating a duty cycle of a basic voltage vector is given in detail as follows:

When the reference voltage vector is in the region A (that is, an outer region of the space vector diagram) in the sector 1, four nearest basic voltage vectors, including two small vectors and two large vectors ($V_{S1}$, $V_{S2}$, $V_{L1}$, and $V_{L2}$), are selected to synthesize the reference voltage vector, and a volt-second balance equation is as follows:

$$\begin{cases} V_{S1} \cdot d_{S1} + V_{S2} \cdot d_{S2} + V_{L1} \cdot d_{L1} + V_{L2} \cdot d_{L2} = V_{ref} \\ d_{S1} + d_{S2} + d_{L1} + d_{L2} = 1 \end{cases} \quad (6)$$

where, $d_{S1}$, $d_{S2}$, $d_{L1}$, and $d_{L2}$ are respectively duty cycles of $V_{S1}$, $V_{S2}$, $V_{L1}$, and $V_{L2}$, and Vref is the reference voltage vector.

The following uses an indirect method to solve the foregoing duty cycles.

If an expression of the basic voltage vector is substituted into the volt-second balance equation, the volt-second balance equation is simplified as follows:

$$\begin{cases} \dfrac{1+\varphi}{3} \cdot V_{dc} \cdot d_{S1} + \dfrac{2}{3} \cdot V_{dc} \cdot d_{L1} = v_g \\ \dfrac{1-\varphi}{3} \cdot V_{dc} \cdot d_{S2} + \dfrac{2}{3} \cdot V_{dc} \cdot d_{L2} = v_h \\ d_{S1} + d_{S2} + d_{L1} + d_{L2} = 1 \end{cases} \quad (7)$$

It can be seen that: Equation (7) includes three equations, but includes four unknowns, and the foregoing duty cycles cannot be directly solved. Therefore, an indirect solution method is designed as follows. It is assumed that a value of $d_{S1}$ is y. Apparently, $0<y<1$, and $d_{S2}$, $d_{L1}$, and $d_{L2}$ may be expressed as follows:

$$\begin{cases} d_{S2} = \dfrac{1}{1+\varphi} \cdot \dfrac{2V_{dc} - 3v_g - 3v_h}{V_{dc}} - \dfrac{1-\varphi}{1+\varphi} \cdot y \\ d_{L1} = \dfrac{3}{2} \cdot \dfrac{v_g}{V_{dc}} - \dfrac{1+\varphi}{2} \cdot y \\ d_{L2} = \dfrac{1}{2} \cdot \left[ \dfrac{3v_h}{V_{dc}} - \dfrac{1-\varphi}{1+\varphi} \cdot \dfrac{2V_{dc} - 3v_g - 3v_h}{V_{dc}} + \dfrac{(1-\varphi)^2}{1+\varphi} \cdot y \right] \end{cases} \quad (8)$$

By considering constraint conditions of the duty cycles $d_{S2}$, $d_{L1}$, and $d_{L2}$: $0<d_{S2}<1$, $0<d_{L1}<1$, and $0<d_{L2}<1$, it may be obtained that y needs to satisfy a constraint condition as follows:

$$\begin{cases} y < \dfrac{1}{1-\varphi} \cdot \dfrac{2V_{dc} - 3v_g - 3v_h}{V_{dc}} - \dfrac{1}{1+\varphi} \cdot \dfrac{3v_g}{V_{dc}} \\ y < \dfrac{1}{1+\varphi} \cdot \dfrac{3v_g}{V_{dc}} \\ y > \dfrac{1}{1-\varphi} \cdot \dfrac{2V_{dc} - 3v_g - 3v_h}{V_{dc}} - \dfrac{1+\varphi}{1-\varphi} \cdot \dfrac{3v_g}{V_{dc}} \end{cases} \quad (9)$$

Therefore, a maximum value ($y_{max}$) and a minimum value ($y_{min}$) of y may be expressed as follows:

$$y_{max} = \min\left\{ 1, \dfrac{1}{1-\varphi} \cdot \dfrac{2V_{dc} - 3v_g - 3v_h}{V_{dc}}, \dfrac{1}{1+\varphi} \cdot \dfrac{3v_g}{V_{dc}} \right\}; \text{ and} \quad (10)$$

$$y_{min} = \max\left\{ 0, \dfrac{1}{1-\varphi} \cdot \dfrac{2V_{dc} - 3v_g - 3v_h}{V_{dc}} - \dfrac{1+\varphi}{(1-\varphi)^2} \cdot \dfrac{3v_h}{V_{dc}} \right\}; \quad (11)$$

An initial value $y_0$ of the duty cycle y is used as an arithmetic mean value of the maximum value ($y_{max}$) and the minimum value ($y_{min}$), that is:

$$y_0 = \dfrac{y_{max} + y_{min}}{2}; \quad (12)$$

When the reference voltage vector is in the region B (that is, an inner region of the space vector diagram) of the sector 1, separate control of a capacitor voltage on the direct current side cannot be realized by using the basic voltage vectors selected according to a nearest three-vector principle. Therefore, in the method according to the present invention, a large vector is additionally selected to generate a new degree of control freedom for separate control of the capacitor voltage on the direct current side. This is specifically described as follows:

When a set value ($V_{diff}^*$) of a voltage difference across capacitors on the direct current side is less than or equal to an actual value ($V_{diff}$) of the voltage difference across capacitors on the direct current side, the large vector $V_{L2}$, the small vectors $V_{S1}$ and $V_{S2}$, and the zero vector $V_Z$ are selected to synthesize the reference voltage vector, and the volt-second balance equation is as follows:

$$\begin{cases} V_Z \cdot d_Z + V_{S1} \cdot d_{S1} + V_{S2} \cdot d_{S2} + V_{L2} \cdot d_{L2} = V_{ref} \\ d_Z + d_{S1} + d_{S2} + d_{L2} = 1 \end{cases} \quad (13)$$

where, $d_Z$ is a duty cycle of the zero vector [OOO].

An expression of the basic voltage vector in Equation (4) is substituted into Equation (13), and the volt-second balance equation may be further simplified as follows:

$$\begin{cases} \frac{1+\varphi}{3} \cdot V_{dc} \cdot d_{S1} = v_g \\ \frac{1-\varphi}{3} \cdot V_{dc} \cdot d_{S2} + \frac{2}{3} \cdot V_{dc} \cdot d_{L2} = v_h \\ d_Z + d_{S1} + d_{S2} + D_{L2} = 1 \end{cases} \quad (14)$$

A duty cycle $d_{L2}$ of the large vector may be used to express duty cycles of other three basic voltage vectors as follows:

$$\begin{cases} d_{S1} = \frac{1}{1+\varphi} \cdot \frac{3v_g}{V_{dc}} \\ d_{S2} = \frac{1}{1-\varphi} \cdot \left(\frac{3v_h}{V_{dc}} - 2 \cdot d_{L2}\right) \\ d_Z = 1 - d_{L2} - \frac{1}{1+\varphi} \cdot \frac{3v_g}{V_{dc}} - \frac{1}{1-\varphi} \cdot \left(\frac{3v_h}{V_{dc}} - 2 \cdot d_{L2}\right) \end{cases} \quad (15)$$

It can be seen that $d_{S1}$ is irrelevant to $d_{L2}$, but $d_{S2}$ may decrease with the increase of $d_{L2}$. It is well known that in an inversion mode, the P-type small vector reduces a voltage at both ends of a capacitor $C_1$ and increases a voltage at both ends of a capacitor $C_2$; and the N-type small vector has an opposite impact on a capacitor voltage on the direct current side. Therefore, the increase of the duty cycle $d_{L2}$ of the large vector may reduce the voltage at both ends of the capacitor $C_1$.

It is assumed that the duty cycle of the large vector is y, and when constraint conditions of the duty cycles of the basic voltage vectors are considered, a value range of y may be obtained as follows:

$$\begin{cases} y < \frac{1}{2} \cdot \frac{3v_h}{V_{dc}} \\ y > \frac{1-\varphi}{(1+\varphi)^2} \cdot \frac{3v_g}{V_{dc}} + \frac{1}{1+\varphi} \cdot \frac{3v_h}{V_{dc}} - \frac{1-\varphi}{1+\varphi} \end{cases} \quad (16)$$

Therefore, a maximum value ($y_{max}$) and a minimum value ($y_{min}$) of y may be expressed as follows:

$$y_{min} = \max\left\{0, \frac{1-\varphi}{(1+\varphi)^2} \cdot \frac{3v_g}{V_{dc}} + \frac{1}{1+\varphi} \cdot \frac{3v_h}{V_{dc}} - \frac{1-\varphi}{1+\varphi}\right\}; \text{ and} \quad (17)$$

$$y_{max} = \min\left\{1, \frac{1}{2} \cdot \frac{3v_h}{V_{dc}}\right\}; \quad (18)$$

A proportional-integral (PI) controller is designed to obtain the duty cycle y. Steps thereof are provided below. A duty cycle of each basic vector may be obtained by substituting the value of y into Equation (15). When $V_{diff}^*$ is greater than $V_{diff}$, the large vector [PPN] is replaced with the large vector [PNN], and the duty cycle of each basic voltage vector is obtained according to the same calculation steps. Details are not described again.

4. Separate Control of the Capacitor Voltage

As described above, in a large-capacity centralized photovoltaic power generation system, one photovoltaic array is connected at both ends of each direct current side capacitor, to separately control voltages at both ends of the two capacitors $C_1$ and $C_2$ on the direct current side, implement a separate MPPT function, and improve system efficiency. Therefore, a difference between $V_{diff}^*$ and $V_{diff}$ is sent to a PI regulator (controller), and an absolute value operation is performed on an output of the PI regulator, to obtain a duty cycle allocation factor modifying value $y_{np}$ of the basic voltage vector, that is:

$$y_{np} = \left|\left(k_p + \frac{k_i}{S}\right) \cdot \left(V_{diff}^* - V_{diff}\right)\right|; \quad (19)$$

where, $k_p$ and $k_i$ are parameters of the PI regulator.

When the reference voltage vector is located in the region A of each sector, and $V_{diff}^* - V_{diff} \leq 0$, the duty cycle of the P-type small vector is updated as follows:

$$y = y_0 + y_{np}; \quad (20)$$

when the reference voltage vector is located in the region A of each sector, and $V_{diff}^* - V_{diff} > 0$, the duty cycle of the P-type small vector is updated as follows:

$$y = y_0 - y_{np}; \quad (21)$$

when the reference voltage vector is located in the region B of each sector, for ease of calculation, the duty cycle of the large vector is set to $y_{np}$:

$$y = y_{np}; \quad (22)$$

and, to ensure accurate generation of the designed switching sequence, amplitude limiting is performed on a duty cycle modifying value of the basic voltage vector, that is:

$$y_{min} < y < y_{max}; \tag{23}$$

5. Design of the Switching Sequence

The switching sequence is designed in consideration of factors such as reducing output current harmonics and reducing switching losses of a power device.

Figure 5:
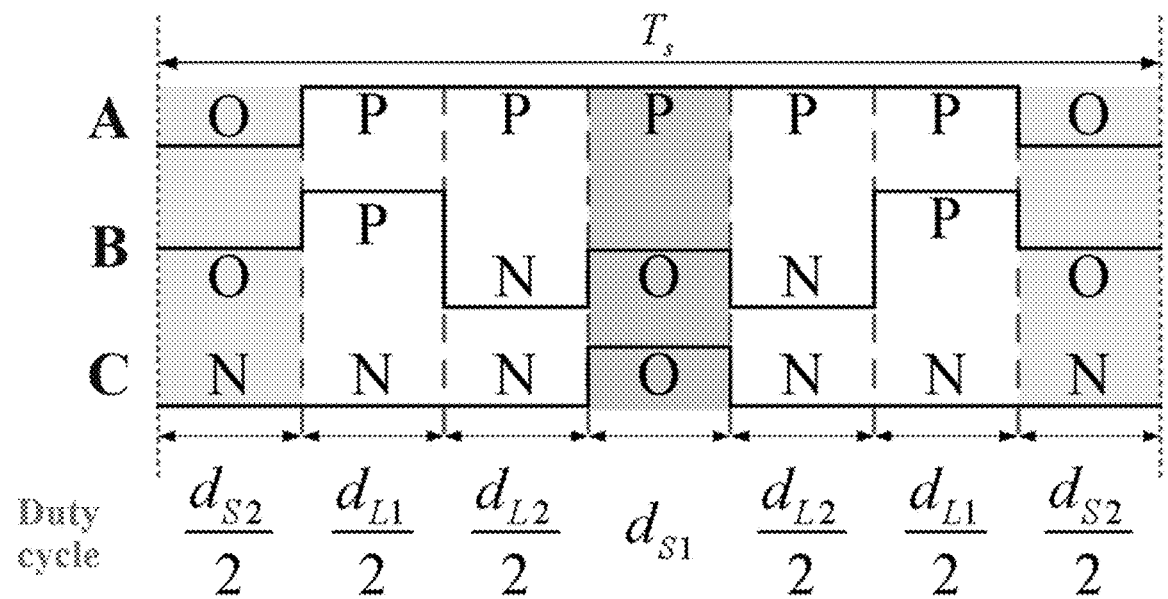
FIG. 5 is a schematic diagram of a switching sequence when a reference voltage vector is located in a sector 1 and a region A.

When the reference voltage vector is located in the region A of the sector 1, the switching sequence is designed as follows: [OON]-[PPN]-[PNN]-[POO]-[PNN]-[PPN]-[OON] (as shown in FIG. 5).

Figure 6:
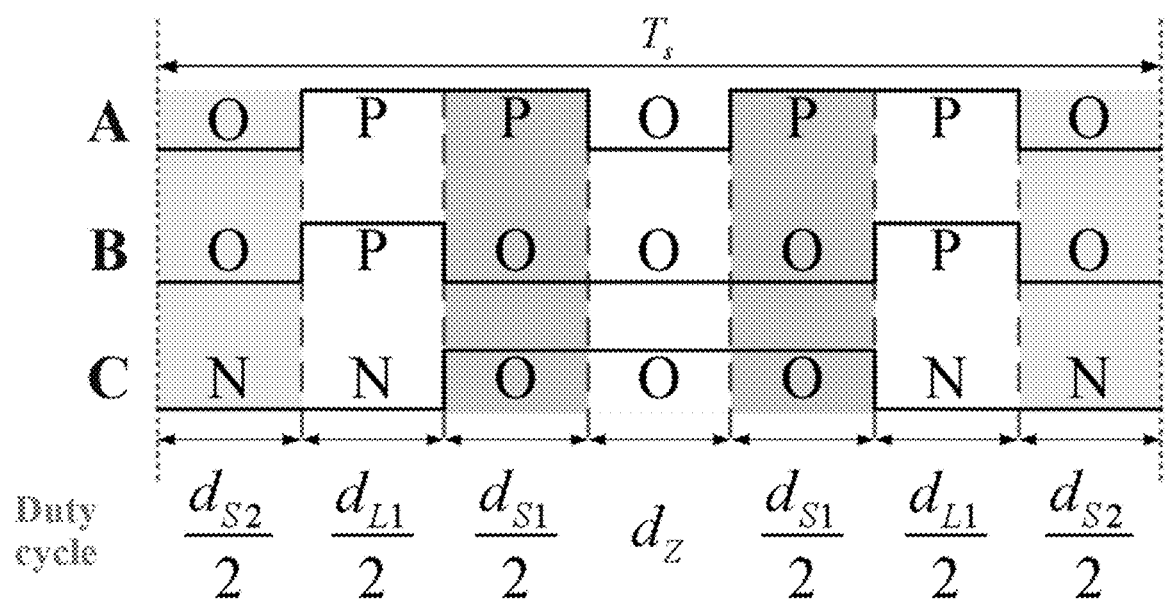
FIG. 6 is a schematic diagram of a switching sequence when a reference voltage vector is located in a sector 1 and a region B, and $V_{diff}^* - V_{diff} \leq 0$.

When the reference voltage vector is located in the region B of the sector 1, and $V_{diff}*-V_{diff} \leq 0$, the switching sequence is designed as follows: [OON]-[PPN]-[POO]-[OOO]-[POO]-[PPN]-[OON] (as shown in FIG. 6).

Figure 7:
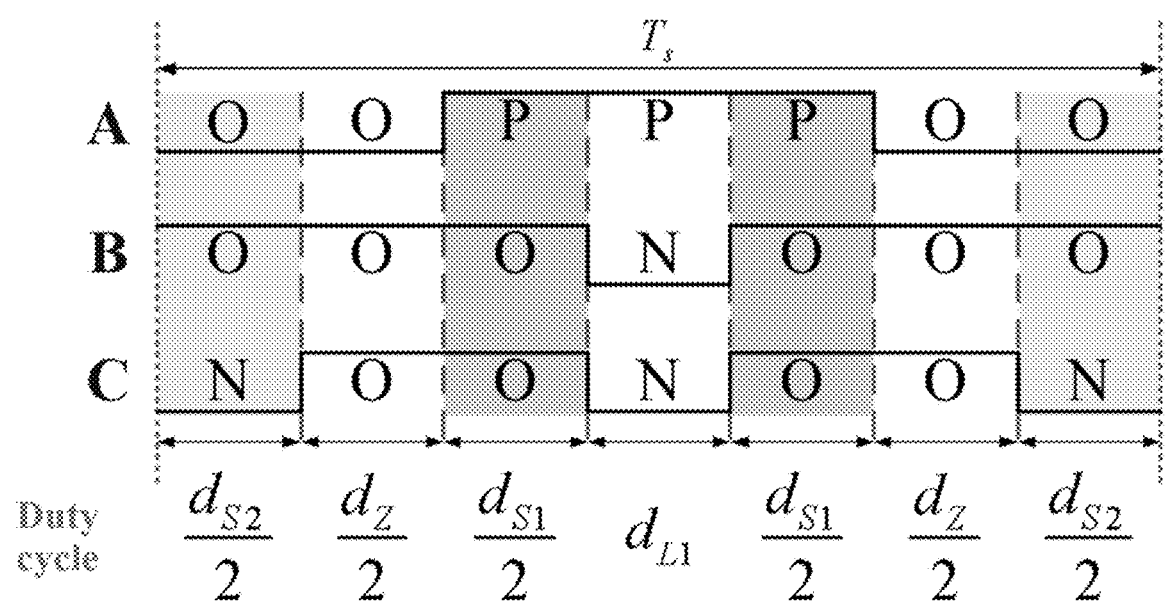
FIG. 7 is a schematic diagram of a switching sequence when a reference voltage vector is located in a sector 1 and a region B, and $V_{diff}^* - V_{diff} > 0$.

When the reference voltage vector is located in the region B of the sector 1, and $V_{diff}*-V_{diff} > 0$, the switching sequence is designed as follows: [OON]-[OOO]-[POO]-[PNN]-[POO]-[OOO]-[OON] (as shown in FIG. 7).

When the reference voltage vector is located in the region A of the sector 2, the switching sequence is designed as follows: [OON]-[PPN]-[NPN]-[POO]-[NPN]-[PPN]-[OON].

When the reference voltage vector is located in the region B of the sector 2, and $V_{diff}*-V_{diff} \leq 0$, the switching sequence is designed as follows: [OON]-[PPN]-[OPO]-[OOO]-[OPO]-[PPN]-[OON].

When the reference voltage vector is located in the region B of the sector 2, and $V_{diff}*-V_{diff} > 0$, the switching sequence is designed as follows: [OON]-[OOO]-[OPO]-[NPN]-[OPO]-[OOO]-[OON].

When the reference voltage vector is located in the region A of the sector 3, the switching sequence is designed as follows: [NOO]-[NPP]-[NPN]-[OPO]-[NPN]-[NPP]-[NOO].

When the reference voltage vector is located in the region B of the sector 3, and $V_{diff}*-V_{diff} \leq 0$, the switching sequence is designed as follows: [NOO]-[NPP]-[OPO]-[OOO]-[OPO]-[NPP]-[NOO].

When the reference voltage vector is located in the region B of the sector 3, and $V_{diff}*-V_{diff} > 0$, the switching sequence is designed as follows: [NOO]-[OOO]-[OPO]-[NNP]-[OPO]-[OOO]-[NOO].

When the reference voltage vector is located in the region A of the sector 4, the switching sequence is designed as follows: [NOO]-[NPP]-[NNP]-[OOP]-[NNP]-[NPP]-[NOO].

When the reference voltage vector is located in the region B of the sector 4, and $V_{diff}*-V_{diff} \leq 0$, the switching sequence is designed as follows: [NOO]-[NPP]-[OOP]-[OOO]-[OOP]-[NPP]-[NOO].

When the reference voltage vector is located in the region B of the sector 4, and $V_{diff}*-V_{diff} > 0$, the switching sequence is designed as follows: [NOO]-[OOO]-[OOP]-[NNP]-[OOP]-[OOO]-[NOO].

When the reference voltage vector is located in the region A of the sector 5, the switching sequence is designed as follows: [ONO]-[PNP]-[NNP]-[OOP]-[NNP]-[PNP]-[ONO].

When the reference voltage vector is located in the region B of the sector 5, and $V_{diff}*-V_{diff} \leq 0$, the switching sequence is designed as follows: [ONO]-[PNP]-[OOP]-[OOO]-[OOP]-[PNP]-[ONO].

When the reference voltage vector is located in the region B of the sector 5, and $V_{diff}*-V_{diff} > 0$, the switching sequence is designed as follows: [ONO]-[OOO]-[OOP]-[OOP]-[OPO]-[OOO]-[ONO].

When the reference voltage vector is located in the region A of the sector 6, the switching sequence is designed as follows: [ONO]-[PNP]-[PNN]-[POO]-[PNN]-[PNP]-[ONO].

When the reference voltage vector is located in the region B of the sector 6, and $V_{diff}*-V_{diff} \leq 0$, the switching sequence is designed as follows: [ONO]-[PNP]-[POO]-[OOO]-[POO]-[PNP]-[ONO].

When the reference voltage vector is located in the region B of the sector 6, and $V_{diff}*-V_{diff} > 0$, the switching sequence is designed as follows: [ONO]-[OOO]-[POO]-[PNN]-[POO]-[OOO]-[ONO].

The switching sequence is converted into a drive signal of a power switch, to control the coupled three-level inverter to operate.

Figure 8A:
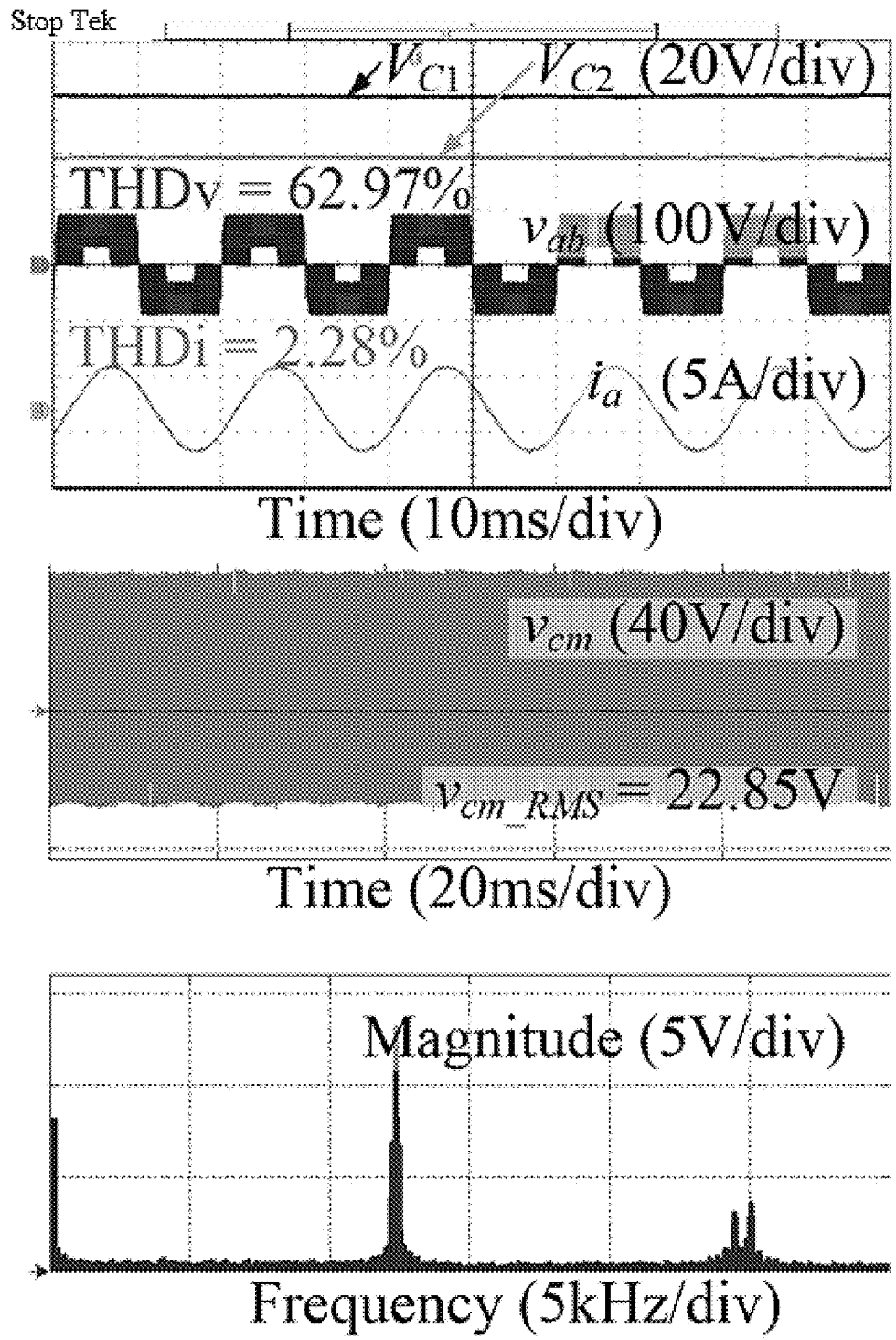
FIG. 8A is a diagram of experimental waveforms of a system using a conventional space vector modulation method with a direct current side unbalancing factor of 0.2 and a modulation degree of 0.8.
Figure 8B:
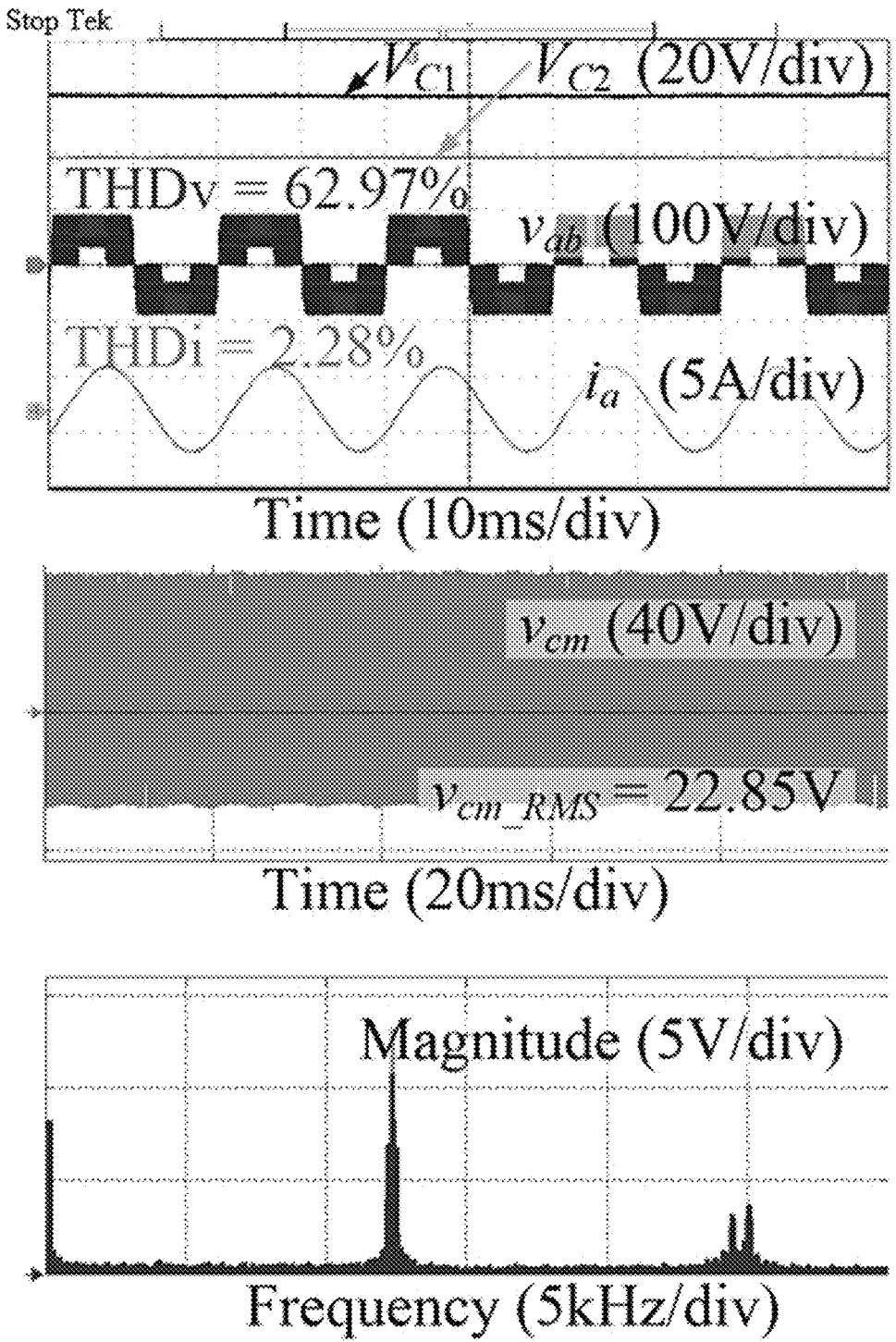
FIG. 8B is a diagram of experimental waveforms of a system using a conventional space vector modulation method with a direct current side unbalancing factor of –0.2 and a modulation degree of 0.8.
Figure 8C:
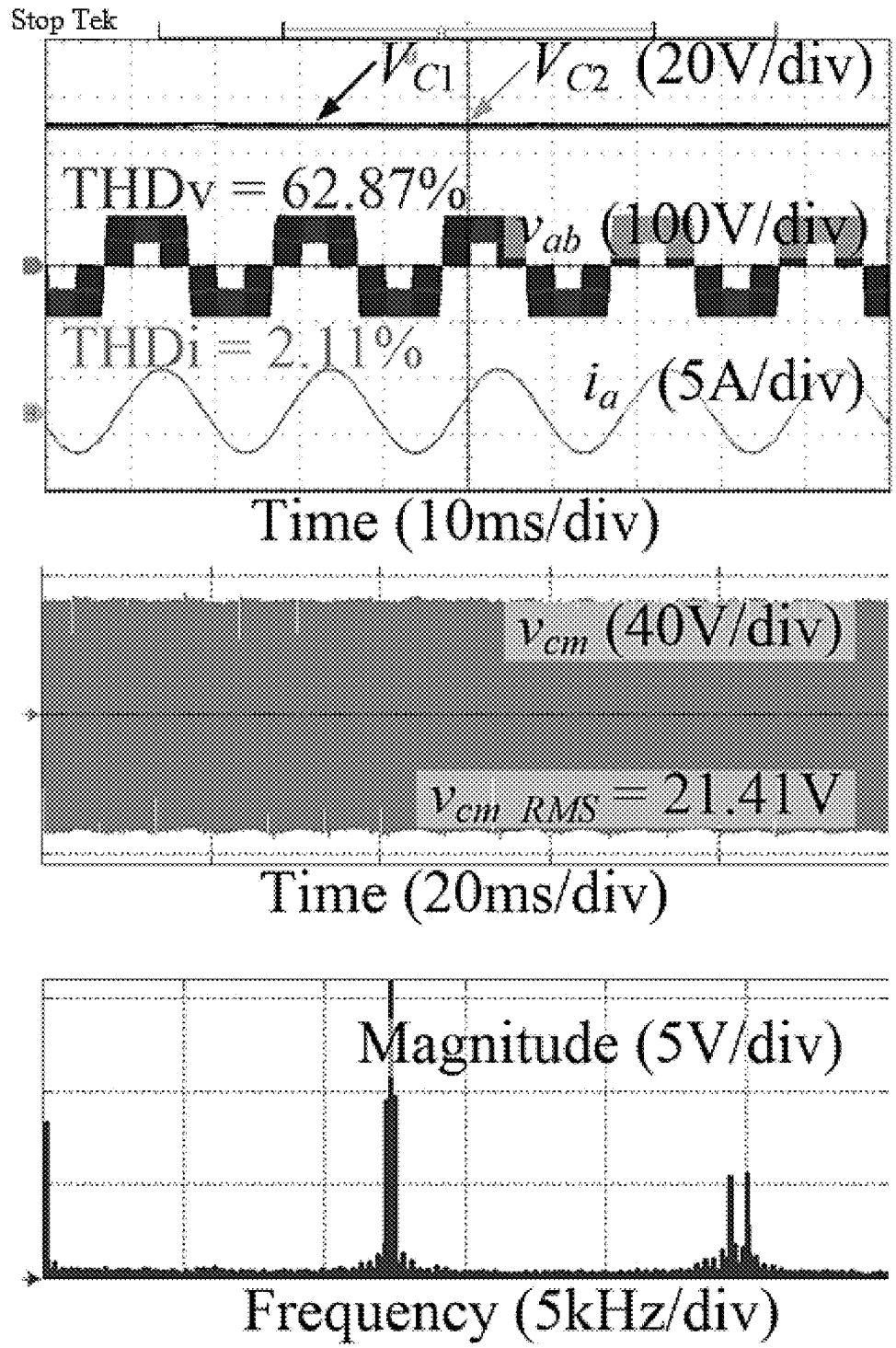
FIG. 8C is a diagram of experimental waveforms of a system using a conventional space vector modulation method with a direct current side unbalancing factor of 0 and a modulation degree of 0.8.

FIG. 8 is a diagram of experimental waveforms of a system using a conventional space vector modulation method with a modulation degree of 0.8, including capacitor voltages ($V_{C1}$ and $V_{C2}$) on a direct current side, a line voltage ($v_{ab}$), an A-phase output voltage ($i_a$), and a common-mode voltage ($v_{cm}$). An unbalancing coefficient in FIG. 8A is 0.2, an unbalancing coefficient in FIG. 8B is −0.2, and an unbalancing coefficient in FIG. 8C is 0. In this case, an input voltage on the direct current side is set to 100 V. It can be seen that common-mode voltage amplitude of the system is very high, and effective values of the common-mode voltage of the system are respectively as high as 22.85 V, 22.96 V, and 21.41 V.

Figure 9A:
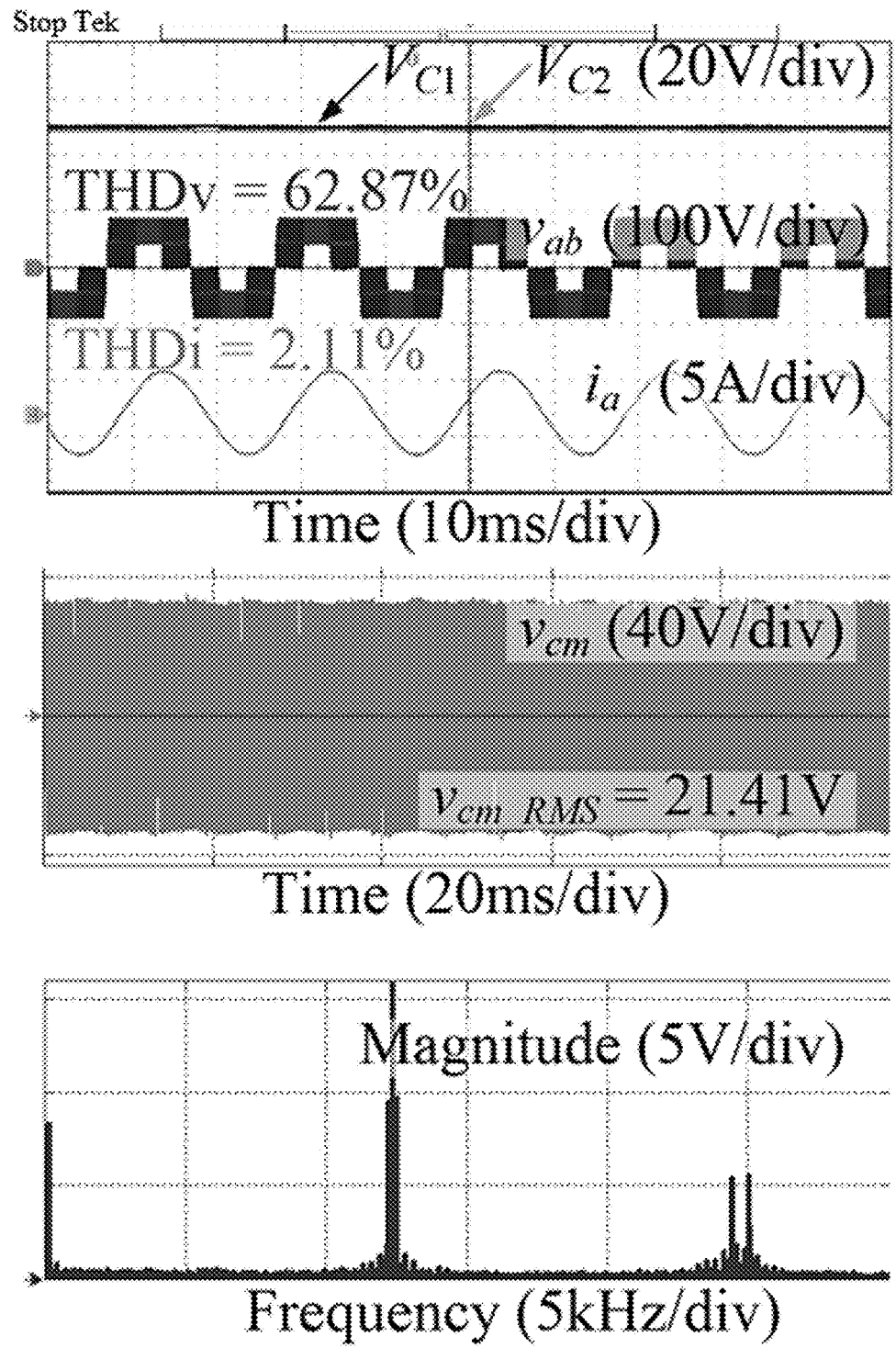
FIG. 9A is a diagram of experimental waveforms of a system using a control method of Example 1 of the present invention with a direct current side unbalancing factor of 0.2 and a modulation degree of 0.8.
Figure 9B:
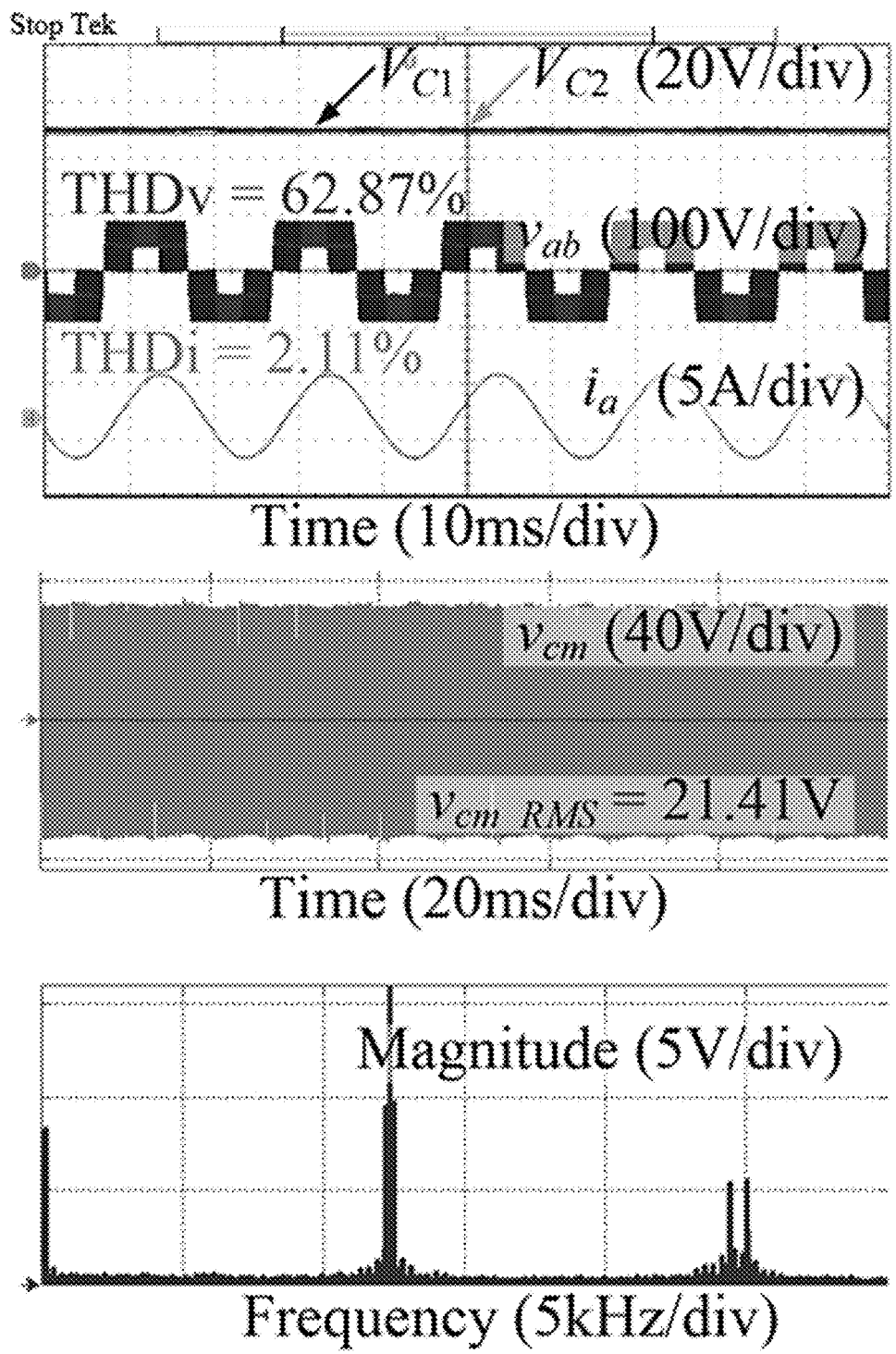
FIG. 9B is a diagram of experimental waveforms of a system using a control method of Example 1 of the present invention with a direct current side unbalancing factor of –0.2 and a modulation degree of 0.8.
Figure 9C:
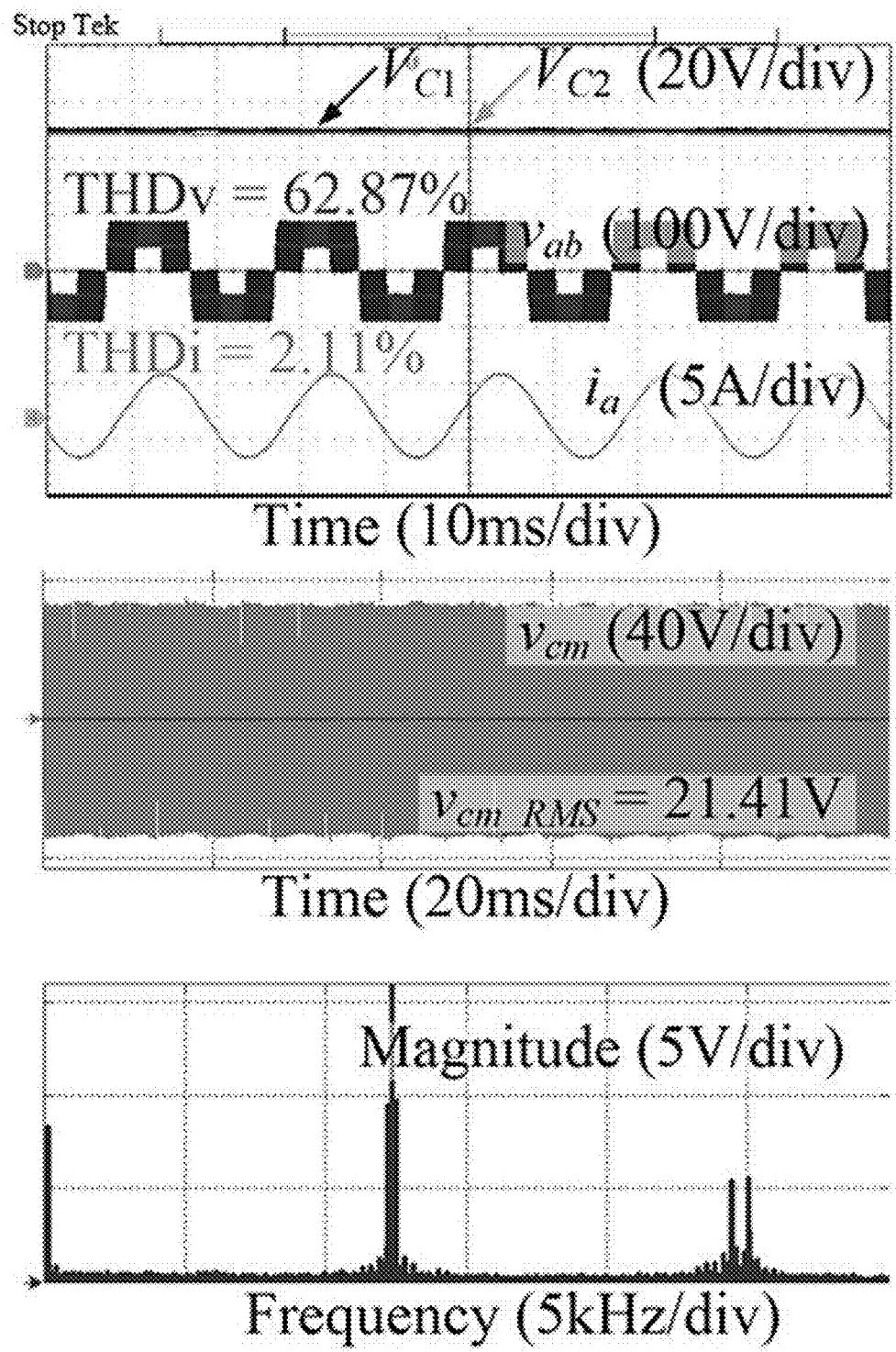
FIG. 9C is a diagram of experimental waveforms of a system using a control method of Example 1 of the present invention with a direct current side unbalancing factor of 0 and a modulation degree of 0.8.
Figure 10A:
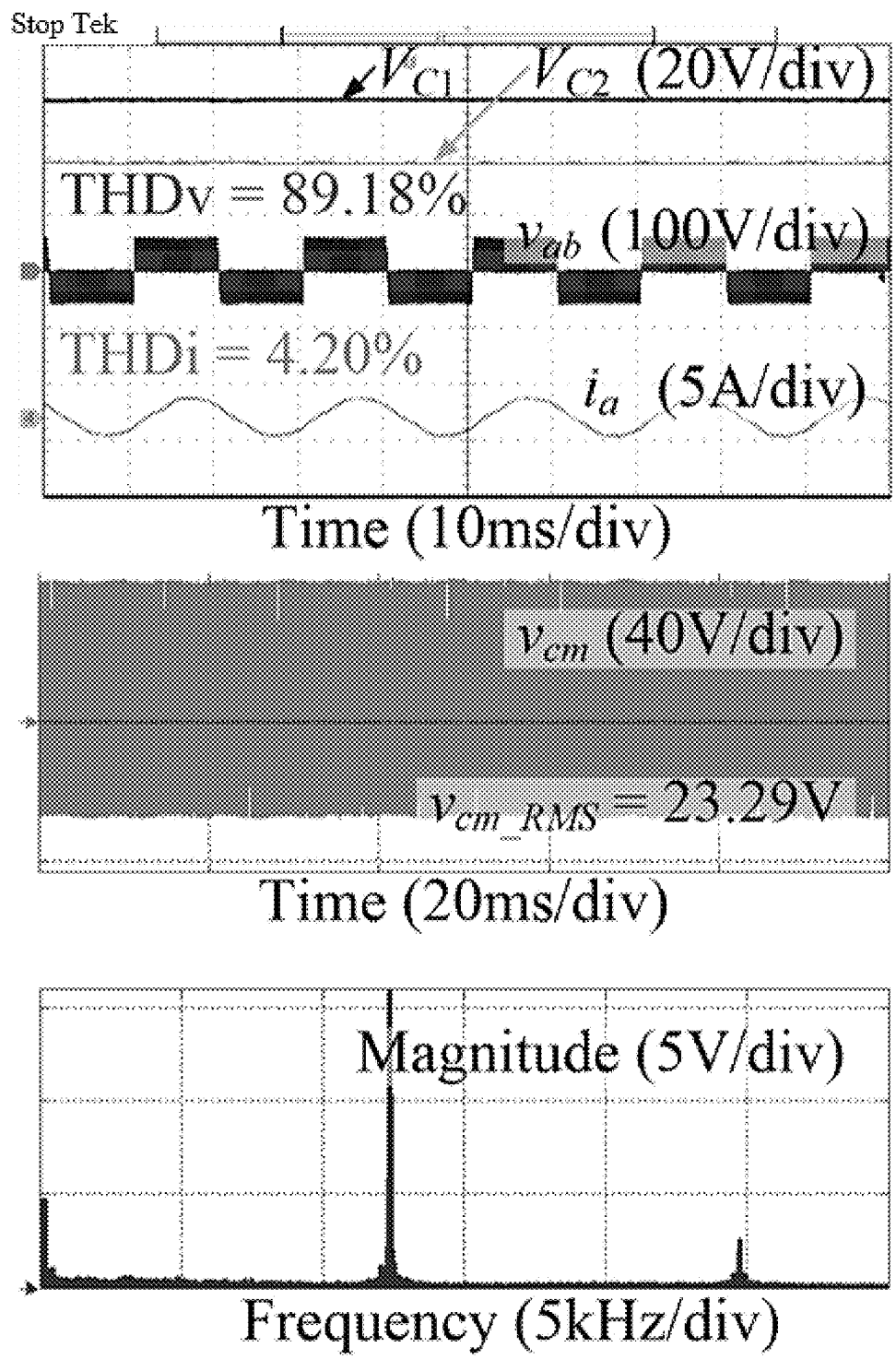
FIG. 10A is a diagram of experimental waveforms of a system using a conventional space vector modulation method with a direct current side unbalancing factor of 0.2 and a modulation degree of 0.4.

FIG. 9 is a diagram of experimental waveforms of a system using a control method of Example 1 of the present invention with a modulation degree of 0.8, including capacitor voltages ($V_{C1}$ and $V_{C2}$) on a direct current side, a line voltage ($v_{ab}$), an A-phase output voltage ($i_a$), and a common-mode voltage (1 cm). An unbalancing coefficient in FIG. 10A is set to 0.2, an unbalancing coefficient in FIG. 9B is set to −0.2, and an unbalancing coefficient in FIG. 9C is set to 0. In this case, an input voltage on the direct current side is set to 100 V. The line voltage has a five-level waveform, and the output current has a sinusoidal waveform. It can be seen that, compared with the conventional space vector modulation method, the common-mode voltage amplitude of the system is reduced by 50%, and good output current quality is maintained. The effective values of the common-mode voltage of the system are respectively reduced to 18.49 V, 18.27 V, and 16.00 V. This is of obvious advantages.

Figure 10B:
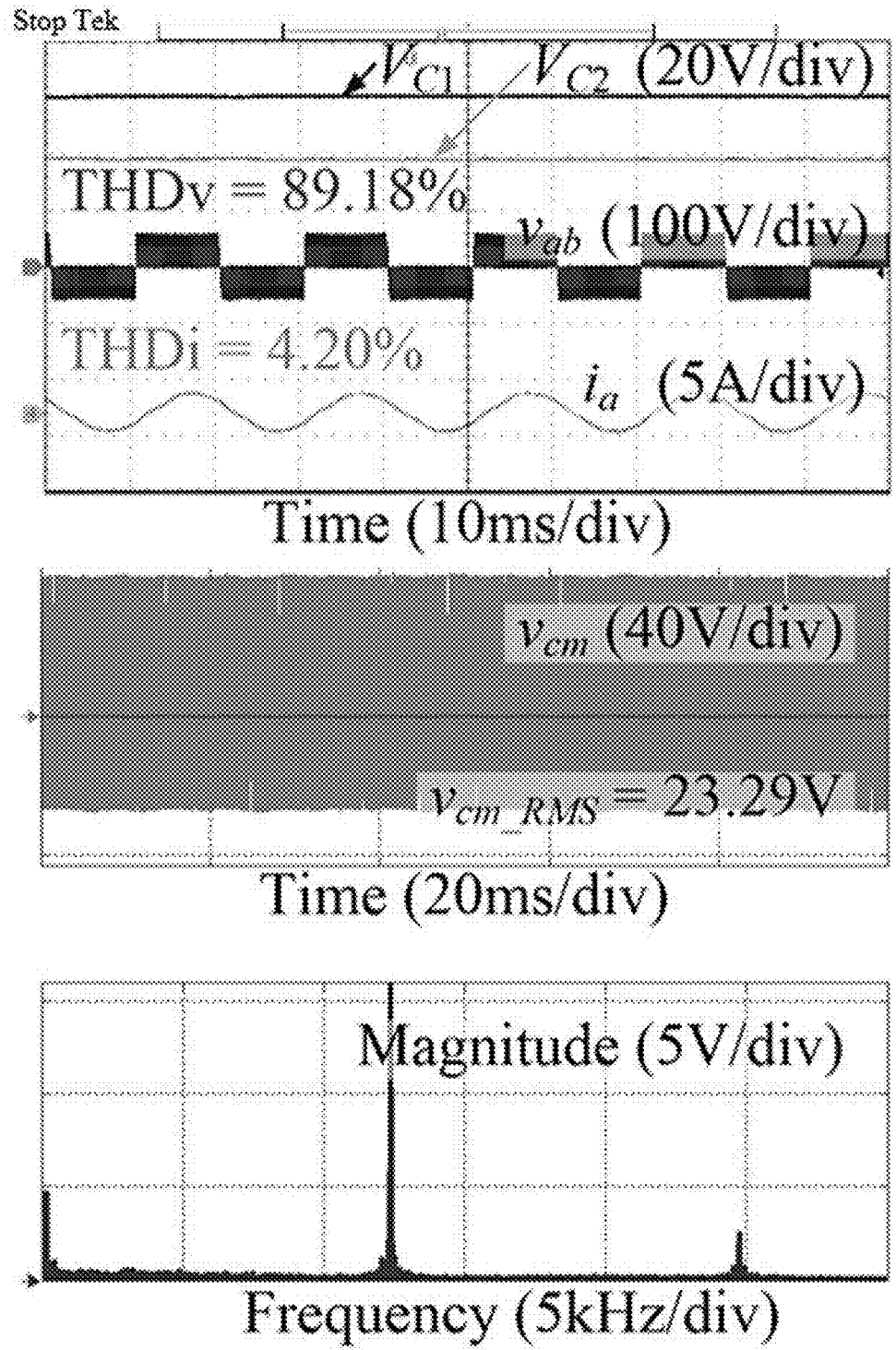
FIG. 10B is a diagram of experimental waveforms of a system using a conventional space vector modulation method with a direct current side unbalancing factor of −0.2 and a modulation degree of 0.4.
Figure 10C:
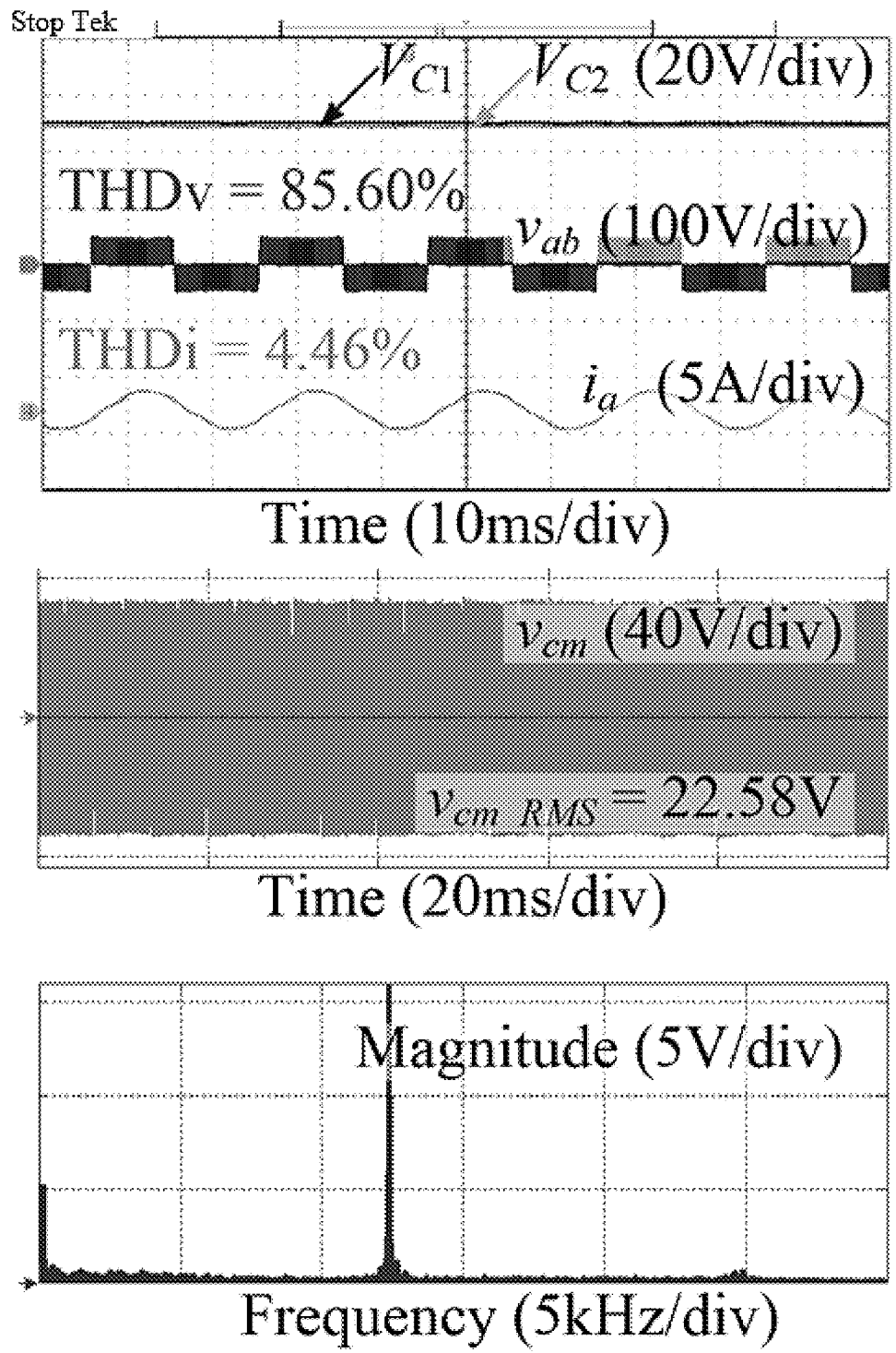
FIG. 10C is a diagram of experimental waveforms of a system using a conventional space vector modulation method with a direct current side unbalancing factor of 0 and a modulation degree of 0.4.

FIG. 10 is a diagram of experimental waveforms of a system using a conventional space vector modulation method with a modulation degree of 0.4, including capacitor voltages ($V_{C1}$ and $V_{C2}$) on a direct current side, a line voltage ($v_{ab}$), an A-phase output voltage ($i_a$), and a common-mode voltage (1 cm). An unbalancing coefficient in FIG. 10A is 0.2, an unbalancing coefficient in FIG. 10B is −0.2, and an unbalancing coefficient in FIG. 10C is 0. In this case, an input voltage on the direct current side is set to 100 V. It can be seen that the line voltage ($v_{ab}$) is reduced to be in a three-level waveform, the output current quality of the system is reduced, and total harmonic distortions of output current (THDi) of the system are respectively 4.20%, 4.46%, and 4.46%. Common-mode voltage amplitude of the system is very high, and effective values of the common-mode voltage of the system are respectively as high as 23.29 V, 23.06 V, and 22.58 V.

Figure 11A:
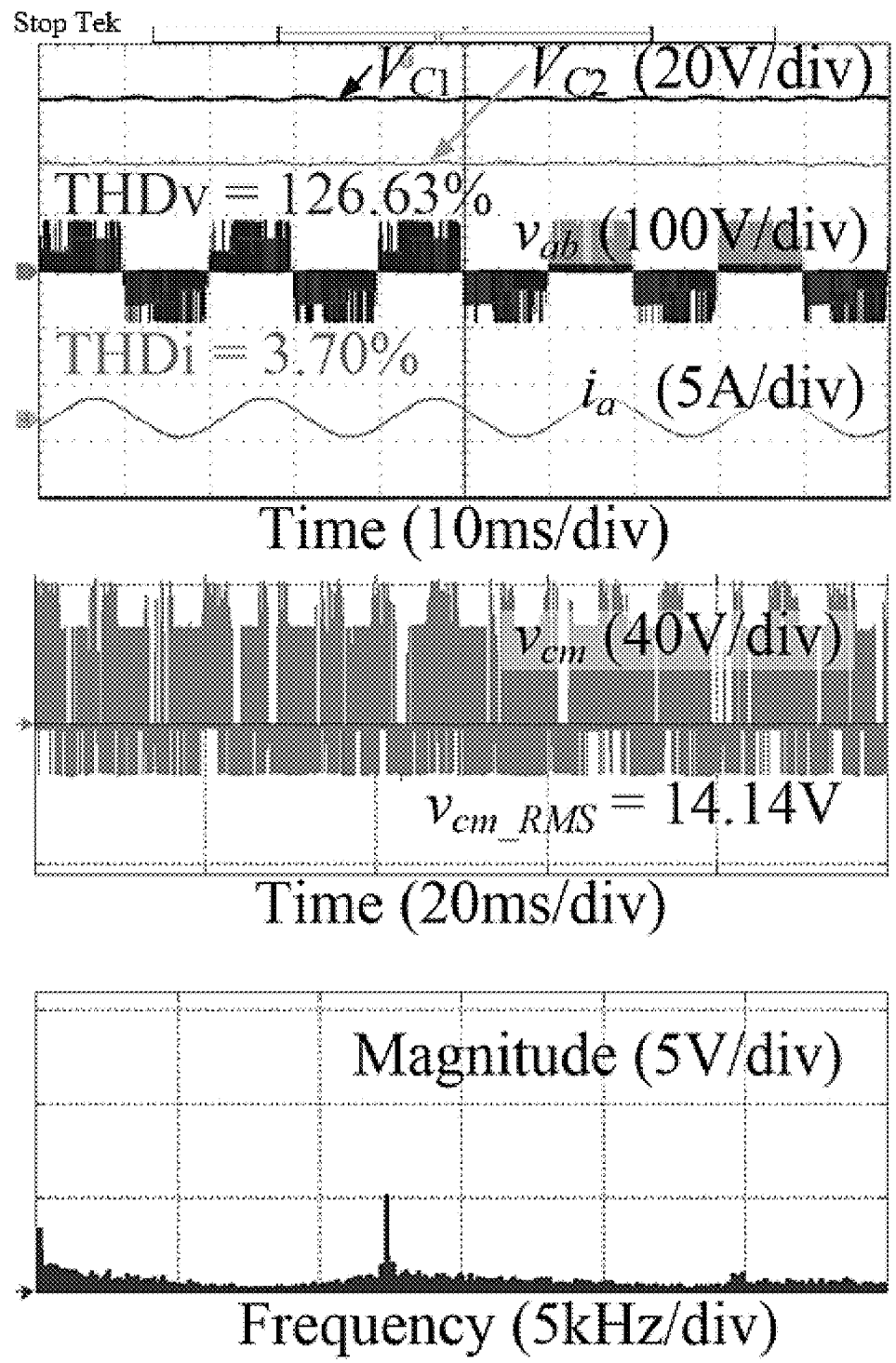
FIG. 11A is a diagram of experimental waveforms of a system using a control method of Example 1 of the present invention with a direct current side unbalancing factor of 0.2 and a modulation degree of 0.4.
Figure 11B:
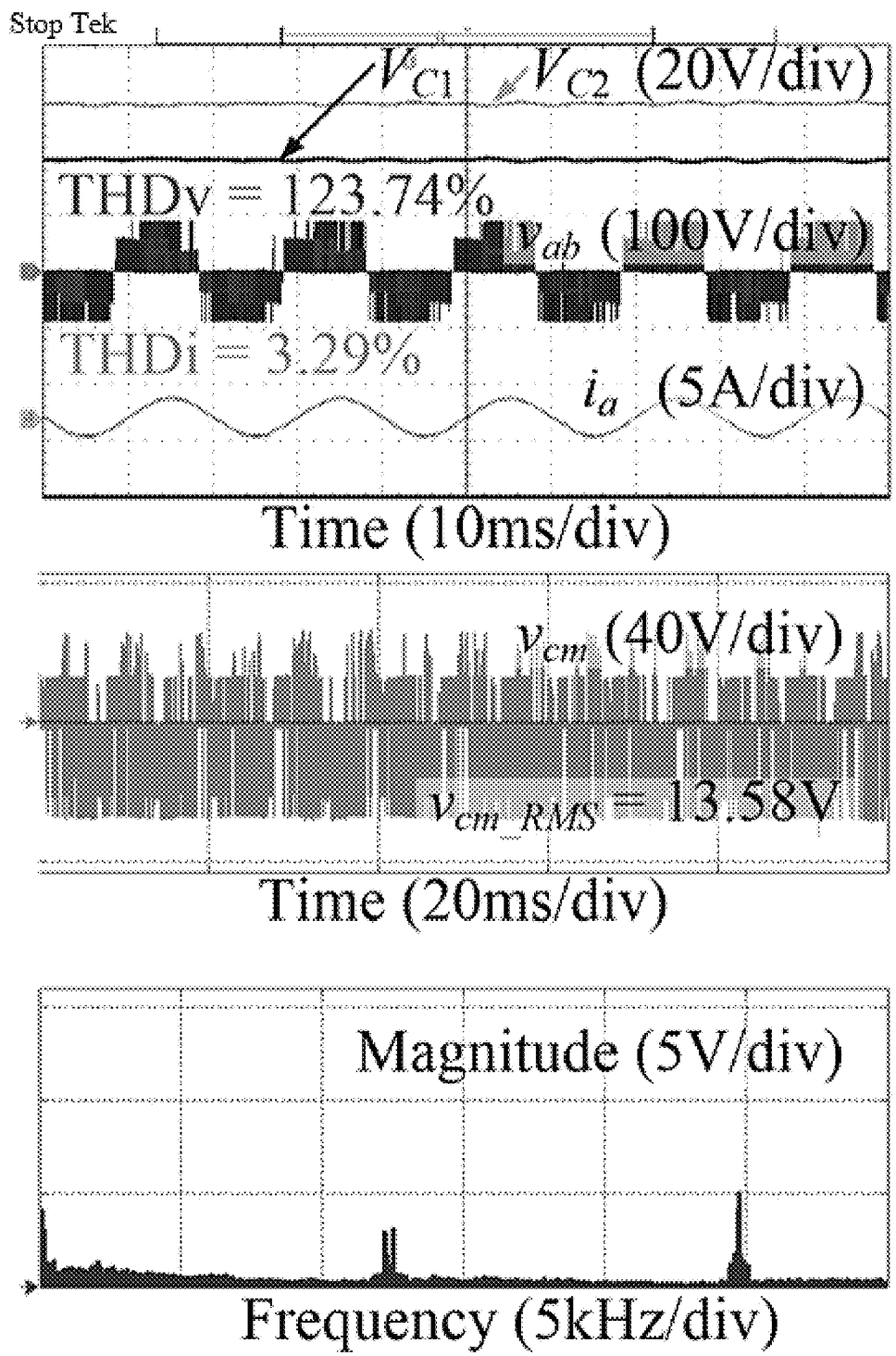
FIG. 11B is a diagram of experimental waveforms of a system using a control method of Example 1 of the present invention with a direct current side unbalancing factor of −0.2 and a modulation degree of 0.4.
Figure 11C:
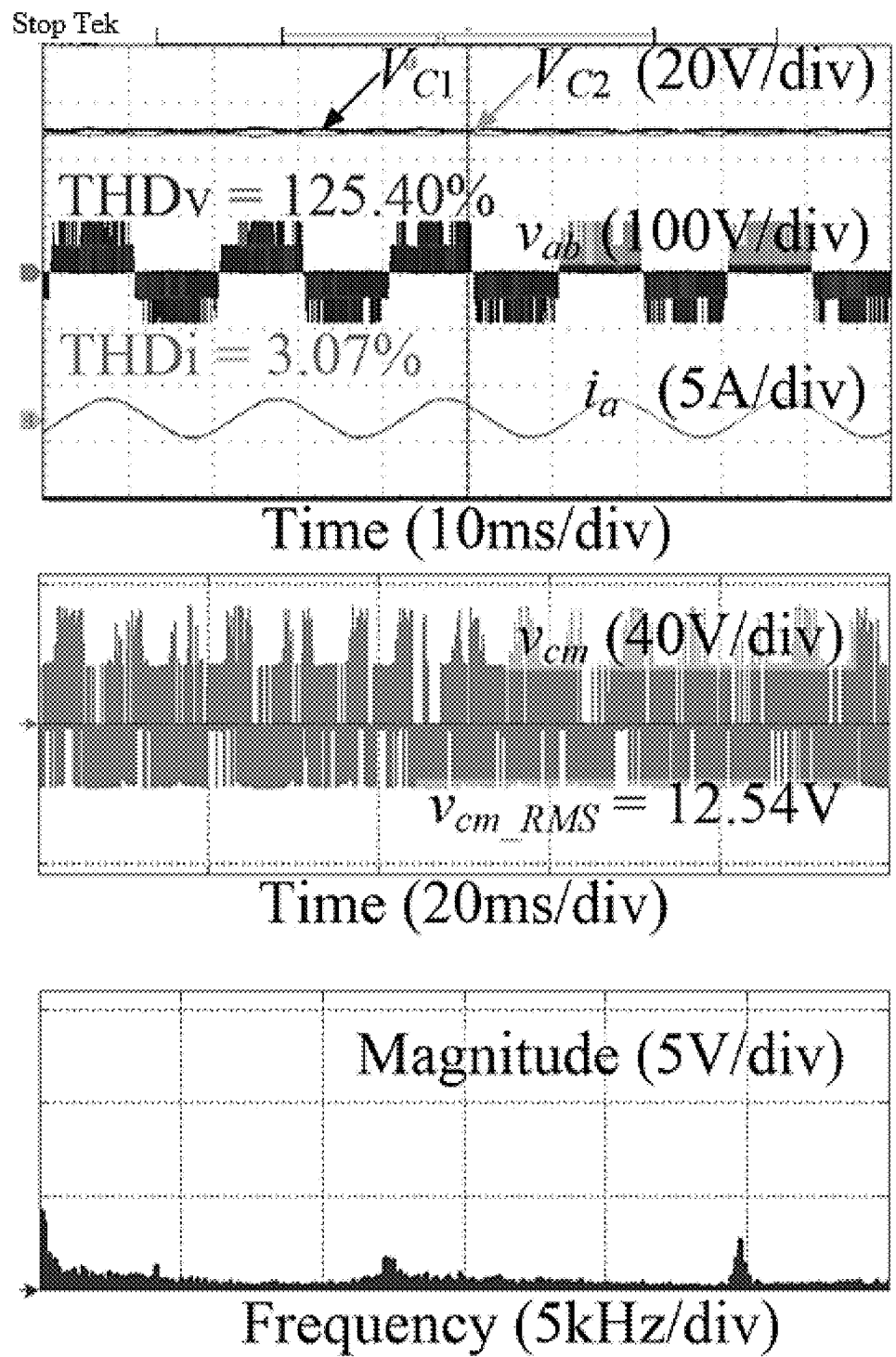
FIG. 11C is a diagram of experimental waveforms of a system using a control method of Example 1 of the present invention with a direct current side unbalancing factor of 0 and a modulation degree of 0.4.
Figure 12A:
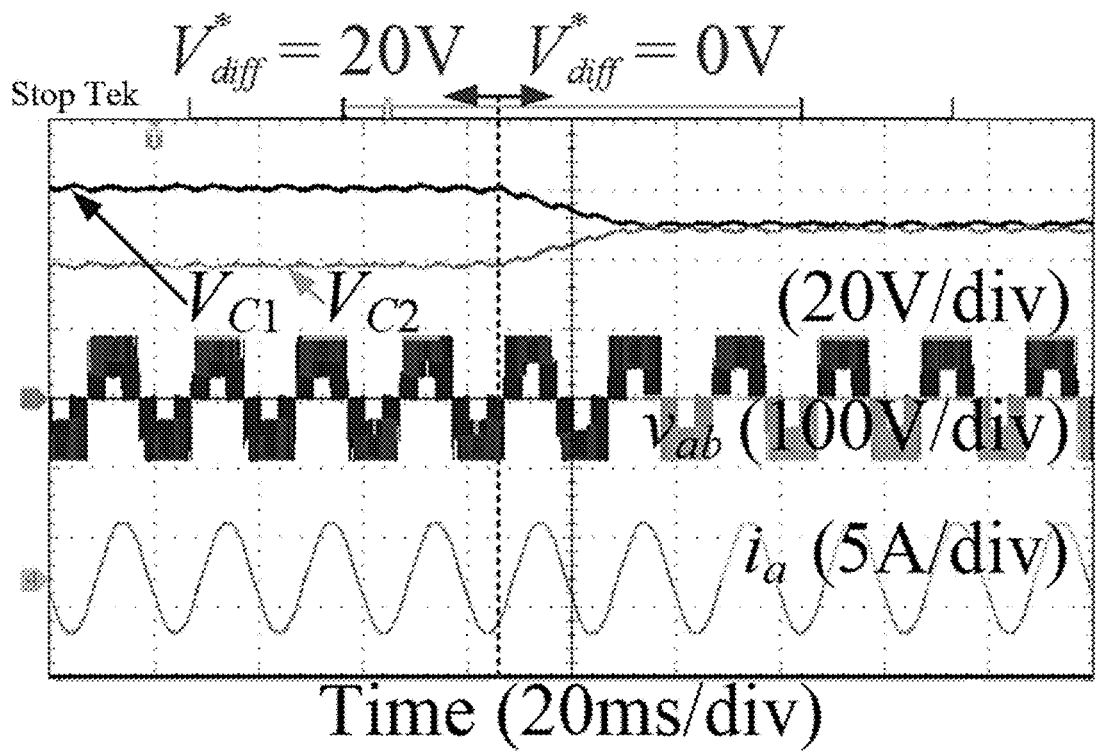
FIG. 12A is a diagram of experimental waveforms of a system using a control method of Example 1 of the present invention with a modulation degree being set to 0.8 and a set value ($V_{diff}^*$) of a capacitor voltage being switching from 20 V to 0 V.
Figure 12B:
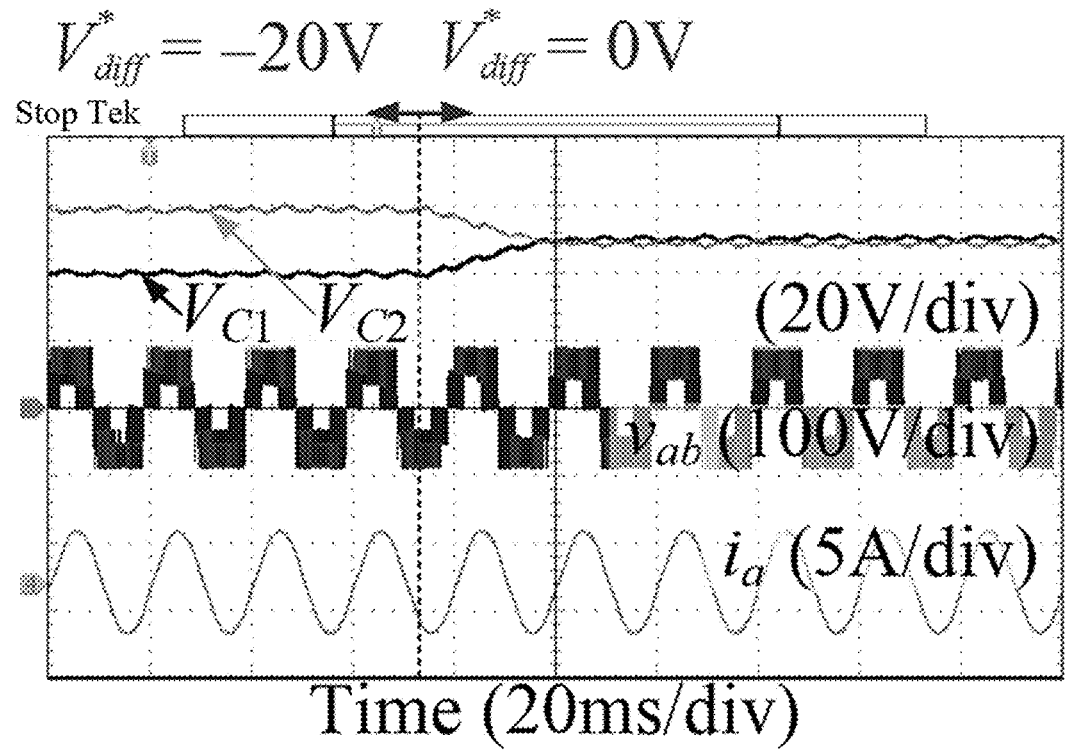
FIG. 12B is a diagram of experimental waveforms of a system using a control method of Example 1 of the present invention with a modulation degree being set to 0.8 and a set value ($V_{diff}^*$) of a capacitor voltage being switching from −20 V to 0 V.
Figure 12C:
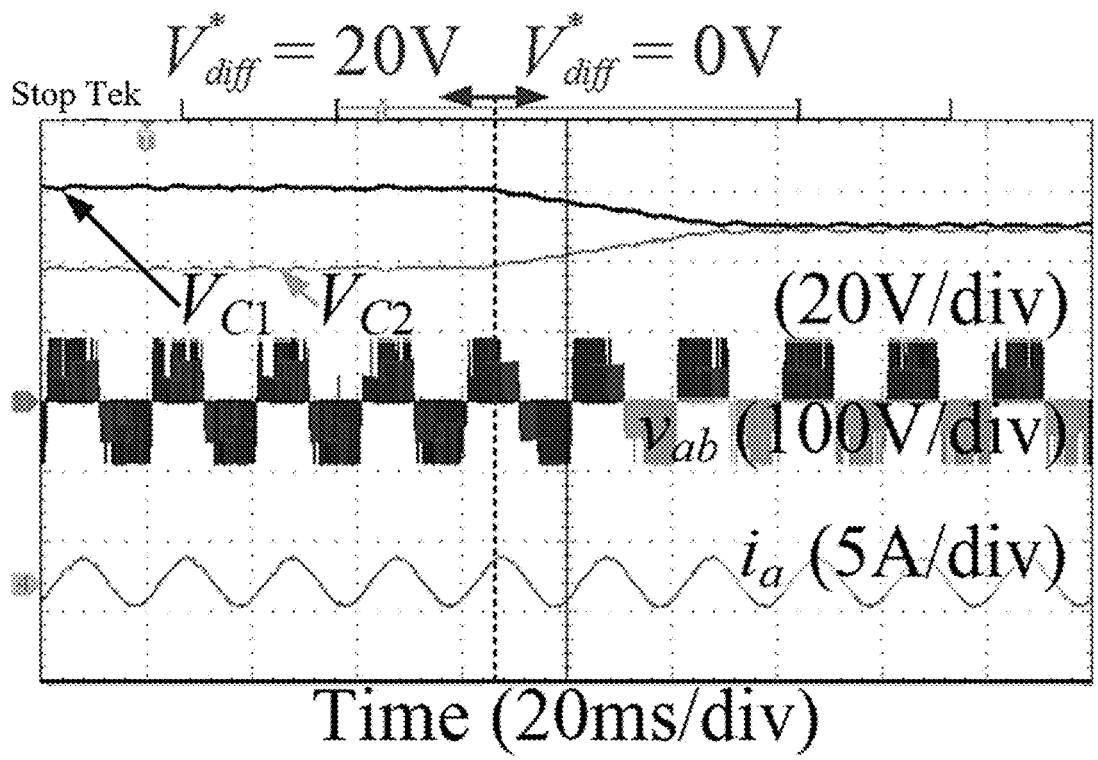
FIG. 12C is a diagram of experimental waveforms of a system using a control method of Example 1 of the present invention with a modulation degree being set to 0.4 and a set value ($V_{diff}^*$) of a capacitor voltage being switching from 20 V to 0 V.
Figure 12D:
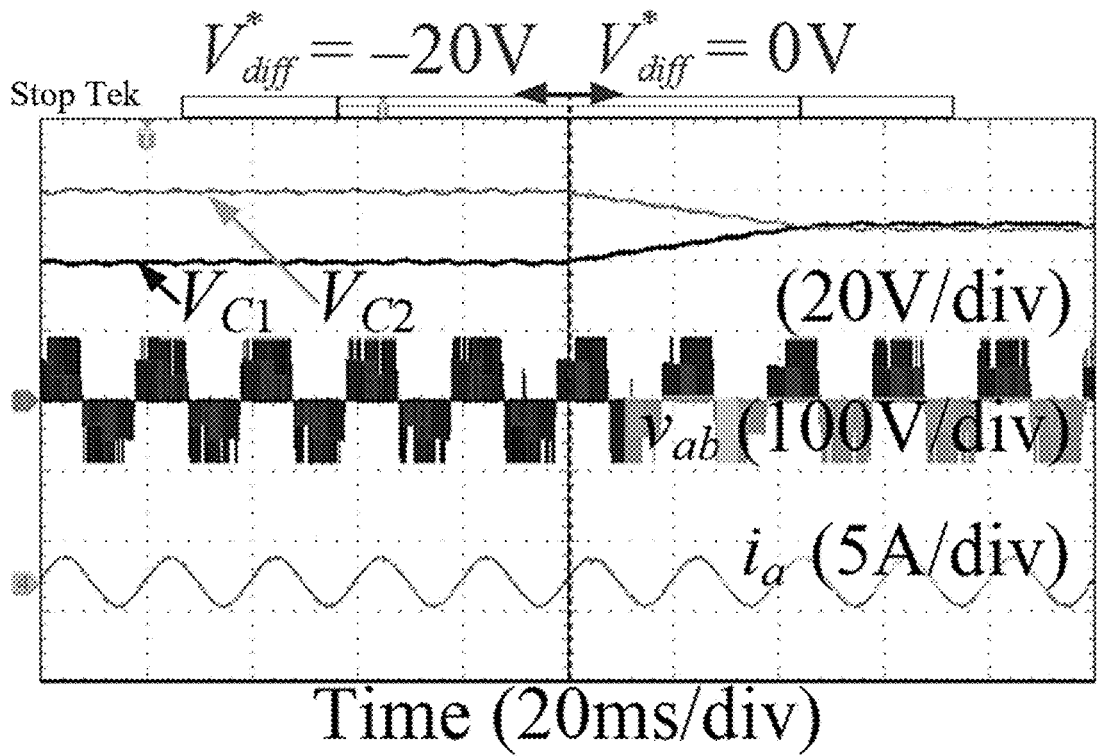
FIG. 12D is a diagram of experimental waveforms of a system using a control method of Example 1 of the present invention with a modulation degree being set to 0.4 and a set value ($V_{diff}^*$) of a capacitor voltage being switching from −20 V to 0 V.

FIG. 11 is a diagram of experimental waveforms of a system using a control method of Example 1 of the present invention with a modulation degree of 0.4, including capacitor voltages ($V_{C1}$ and $V_{C2}$) on a direct current side, a line voltage ($v_{ab}$), an A-phase output voltage ($i_a$), and a common-mode voltage ($v_{cm}$). An unbalancing coefficient in FIG. 11A is set to 0.2, an unbalancing coefficient in FIG. 11B is set to −0.2, and an unbalancing coefficient in FIG. 11C is set to 0. In this case, an input voltage on the direct current side is set to 100 V. The line voltage has a five-level waveform, and the output current has a sinusoidal waveform. It can be seen that, in a case of a low modulation degree, waveform quality of the output current is obviously improved compared with that in the conventional space vector modulation method, and the common-mode voltage of the system is reduced by 50% compared with that in the conventional space vector modulation method. The effective values of the common-mode voltage of the system are respectively reduced to 18.49 V, 18.27 V, and 16.00 V, and are respectively reduced by 29.29%, 41.11%, and 44.46% compared with those in the conventional space vector modulation method. This is of obvious advantages.

FIG. 12 is a diagram of experimental waveforms of a system using a control method of Example 1 of the present invention when a step change occurs in a set value of a voltage difference across capacitors. It can be seen that, according to the control method in Example 1 of the present invention, two capacitor voltages on the direct current side can be separately controlled. In addition, in the control method of Example 1 of the present invention, good waveform quality of the output current is maintained while common-mode voltage suppression is realized in a dynamic case.

Example 2

The present example provides a system for cooperatively suppressing a common-mode voltage and current harmonics of a coupled three-level inverter, including:
  a sector determining module, configured to determine, based on an amplitude and a phase angle of a reference voltage vector, a sector and a region in which the reference voltage vector is located;
  a basic voltage vector selection module, configured to select, based on the sector and the region in which the reference voltage vector is located, a set value of a voltage difference across capacitors on a direct current side, and an actual value of the voltage difference across capacitors on the direct current side, four basic voltage vectors with low common-mode voltage amplitudes to synthesize the reference voltage vector;
  a basic voltage vector duty cycle calculation module, configured to write a volt-second balance equation based on the selected basic voltage vectors, and calculating duty cycles of the basic voltage vectors by using an indirect method;
  a capacitor voltage separate control module, configured to update the duty cycles of the basic voltage vectors based on the sector and the region in which the reference voltage vector is located, the set value of the voltage difference across capacitors on the direct current side, and the actual value of the voltage difference across capacitors on the direct current side, to realize separate control of the capacitor voltage; and
  a drive signal generation module, configured to design a switching sequence based on the sector and the region in which the reference voltage vector is located, the set value of the voltage difference across capacitors on the direct current side, and the actual value of the voltage difference across capacitors on the direct current side, and convert the switching sequence into a PWM drive signal of a power switch, to control the coupled three-level inverter to operate.

The above modules have same examples and application scenarios in which the corresponding steps are implemented, but are not limited to content disclosed in Example 1. It should be noted that, as a part of the system, the foregoing modules may be executed in, for example, a computer system having a group of computer executable instructions.

In the foregoing embodiments, the descriptions of the embodiments have their respective focuses. For a part that is not described in detail in an embodiment, refer to related descriptions in other embodiments.

The proposed system may be implemented in other manners. For example, the system embodiments described above are merely examples. For example, division into the modules is merely a logical function division and there may be other division in actual implementation. For example, a plurality of modules may be combined or integrated into another system, or some features may be ignored or not performed.

Example 3

The present example provides a computer-readable storage medium, having a computer program stored thereon, where when the program is executed by a processor, causing the process to implement steps of the method for cooperatively suppressing the common-mode voltage and current harmonics of the coupled three-level inverter according to Example 1.

Example 4

The present example provides a computer device, including a memory, a processor, and a computer program stored in the memory and capable of running on the processor, and when the processor executes the program, causing the process to implements steps of the method for cooperatively suppressing the common-mode voltage and current harmonics of the coupled three-level inverter according to Example 1.

A person skilled in the art should understand that the embodiments of the present invention may be provided as a method, a system, or a computer program product. Therefore, the present invention may use a form of hardware embodiments, software embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each procedure and/or each block in the flowcharts and/or the block diagrams and a combination of a procedure and/or a block in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

These computer program instructions may alternatively be loaded onto the computer or another programmable data processing device, so that a series of operational steps are performed on the computer or another programmable device for a process implemented by the computer. Therefore, the instructions executed on the computer or another programmable device provide steps for implementing the specified function in one or more procedures in the flowcharts and/or in one or more blocks in the block diagrams.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the embodiments of the foregoing methods can be included. The foregoing storage medium may include a magnetic disc, an optical disc, a read-only memory (Read-Only Memory, ROM), a random access memory (Random Access Memory, RAM), or the like.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

The invention claimed is:

1. A method for cooperatively suppressing a common-mode voltage and current harmonics of a coupled three-level inverter, comprising:
  a space vector diagram being divided into 6 sectors: a sector 1 to a sector 6, and each sector being further divided into two small regions, namely, a region A and a region B; a boundary between the region A and the region B being a connection line of two small vectors, an inner side of the end point connection line of the two small vectors indicating the region B, and an outer side being the region A;
  determining, based on an amplitude and a phase angle of a reference voltage vector, a sector and a region in which the reference voltage vector is located;
  selecting, based on the sector and the region in which the reference voltage vector is located, a set value of a voltage difference across capacitors on a direct current side, and an actual value of the voltage difference across capacitors on the direct current side, basic voltage vectors to synthesize the reference voltage vector; wherein,
  basic voltage vectors in the sector 1 comprising a small vector $V_{S1}$ POO, a small vector $V_{S2}$ OON, a large vector $V_{L1}$ PNN, a large vector $V_{L2}$ PPN, and a zero vector $V_Z$ OOO, and an expression of each basic voltage vector being as follows:

$$\begin{cases} V_{S1} = \frac{1+\varphi}{3} V_{dc} \cdot e^{j0} \\ V_{S2} = \frac{1+\varphi}{3} V_{dc} \cdot e^{j\frac{\pi}{3}} \\ V_{L1} = \frac{2}{3} V_{dc} \cdot e^{j0} \\ V_{L2} = \frac{2}{3} V_{dc} \cdot e^{j\frac{\pi}{3}} \\ V_Z = 0 \end{cases} ;$$

wherein, Vac indicates a sum of two capacitor voltages on the direct current side, and when the reference voltage vector is located in the region A of each sector, four nearest basic voltage vectors, comprising two small vectors and two large vectors $V_{S1}$, $V_{S2}$, $V_{L1}$, and $V_{L2}$, are used to synthesize the reference voltage vector; when the reference voltage vector is located in the region B of each sector, separate control of a capacitor voltage on the direct current side cannot be realized by using the basic voltage vectors selected according to a nearest three-vector principle, the reference voltage vectors are synthesized into a large vector, to generate a new degree of control freedom for separate control of the capacitor voltage on the direct current side, and specifically, when the set value $V_{diff}$ of the voltage difference across capacitors on the direct current side is less than or equal to the actual value $V_{diff}$ of the voltage difference across capacitors on the direct current side, the large vector $V_{L2}$, the small vectors $V_{S1}$ and $V_{S2}$, and the zero vector $V_Z$ are selected to synthesize the reference voltage vector; when $V_{diff}$ is greater than $V_{diff}$, the large vector PPN is replaced with the large vector PNN, and the reference voltage vector is obtained according to the same calculation steps; and when the reference voltage vector is located in another sector, the basic voltage vectors are selected according to the foregoing steps;
  writing a volt-second balance equation based on the selected basic voltage vectors, and calculating duty cycles of the basic voltage vectors by using an indirect method;
  updating the duty cycles of the basic voltage vectors based on the sector and the region in which the reference voltage vector is located, the set value of the voltage difference across capacitors on the direct current side, and the actual value of the voltage difference across capacitors on the direct current side, to realize separate control of the capacitor voltage; and
  designing a switching sequence based on the sector and the region in which the reference voltage vector is located, the set value of the voltage difference across capacitors on the direct current side, and the actual value of the capacitor difference on the direct current side, and converting the switching sequence into a pulse-width modulation (PWM) drive signal of a power switch, to control the coupled three-level inverter to operate.

2. The method for cooperatively suppressing the common-mode voltage and current harmonics of the coupled three-level inverter according to claim 1, wherein the writing a volt-second balance equation based on the selected basic voltage vector, and calculating a duty cycle of the basic voltage vector by using an indirect method, specifically comprises:

when the reference voltage vector is located in the region A of each sector, selecting four nearest basic voltage vectors to construct the volt-second balance equation;

when the reference voltage vector is located in the region A of each sector, determining, by using a duty cycle of a small vector as a solved value, duty cycles of other three basic voltage vectors by using the indirect method;

when the reference voltage vector is located in the region B of each sector, selecting one large vector, two small vectors, and one zero vector, to construct the volt-second balance equation; and when the reference voltage vector is located in the region B of each sector, determining, by using a duty cycle of the large vector as a solved value, duty cycles of other three vectors by using the indirect method.

3. The method for cooperatively suppressing the common-mode voltage and current harmonics of the coupled three-level inverter according to claim 1, wherein the updating the duty cycle of the basic voltage vector based on the sector and the region in which the reference voltage vector is located, the set value of the voltage difference across capacitors on the direct current side, and the actual value of the voltage difference across capacitors on the direct current side, to realize separate control of the capacitor voltage, comprises:

sending a difference between the set value of the voltage difference across capacitors on the direct current side and the actual value of the voltage difference across capacitors on the direct current side to a proportional-integral (PI) controller, and performing an absolute value operation on an output of the PI controller, to obtain a duty cycle allocation factor modifying value of the basic voltage vector; and updating the duty cycle of the basic voltage vector based on the sector and the region in which the reference voltage vector is located, and a value of the difference between the set value of the voltage difference across capacitors on the direct current side and the actual value of the voltage difference across capacitors on the direct current side.

4. The method for cooperatively suppressing the common-mode voltage and current harmonics of the coupled three-level inverter according to claim 3, wherein the updating the duty cycle of the basic voltage vector based on the sector and the region in which the reference voltage vector is located, and a value of the difference between the set value of the voltage difference across capacitors on the direct current side and the actual value of the voltage difference across capacitors on the direct current side, comprises:

when the reference voltage vector is located in the region A of each sector, and the difference between the set value of the voltage difference across capacitors on the direct current side and the actual value of the voltage difference across capacitors on the direct current side≤0, updating a duty cycle of a P-type small vector to a sum of an initial value and the duty cycle allocation factor modifying value of the basic voltage vector;

when the reference voltage vector is located in the region A of each sector, and the difference between the set value of the voltage difference across capacitors on the direct current side and the actual value of the voltage difference across capacitors on the direct current side>0, updating the duty cycle of the P-type small vector to a difference between the initial value and the duty cycle allocation factor modifying value of the current voltage vector; and when the reference voltage vector is located in an inner region of the space vector diagram of each sector, using the duty cycle allocation factor modifying value of the basic voltage vector as a duty cycle of a large vector, and a value of the duty cycle of the large vector falling within a limit range.

5. The method for cooperatively suppressing the common-mode voltage and current harmonics of the coupled three-level inverter according to claim 4, wherein after the duty cycle of the basic voltage vector is updated, updating, based on the updated duty cycle of the basic voltage vector, duty cycles of other basic voltage vectors by using the indirect method.

6. The method for cooperatively suppressing the common-mode voltage and current harmonics of the coupled three-level inverter according to claim 1, wherein the designing a switching sequence based on the sector and the region in which the reference voltage vector is located, the set value of the voltage difference across capacitors on the direct current side, and the actual value of the capacitor difference on the direct current side, comprises:

when the reference voltage vector is located in an outer region of the space vector diagram in the sector 1, designing the switching sequence as follows: [OON]-[PPN]-[PNN]-[POO]-[PNN]-[PPN]-[OON];

when the reference voltage vector is located in an inner region of the space vector diagram in the sector 1, and a difference between the set value of the voltage difference across capacitors on the direct current side and the actual value of the voltage difference across capacitors on the direct current side≤0, designing the switching sequence as follows: [OON]-[PPN]-[POO]-[OOO]-[POO]-[PPN]-[OON];

when the reference voltage vector is located in an inner region of the space vector diagram in the sector 1, and a difference between the set value of the voltage difference across capacitors on the direct current side and the actual value of the voltage difference across capacitors on the direct current side>0, designing the switching sequence as follows: [OON]-[OOO]-[POO]-[PNN]-[POO]-[OOO]-[OON];

when the reference voltage vector is located in an outer region of the space vector diagram in the sector 2, designing the switching sequence as follows: [OON]-[PPN]-[NPN]-[POO]-[NPN]-[PPN]-[OON];

when the reference voltage vector is located in an inner region of the space vector diagram in the sector 2, and a difference between the set value of the voltage difference across capacitors on the direct current side and the actual value of the voltage difference across capacitors on the direct current side≤0, designing the switching sequence as follows: [OON]-[PPN]-[OPO]-[OOO]-[OPO]-[PPN]-[OON];

when the reference voltage vector is located in an inner region of the space vector diagram in the sector 2, and a difference between the set value of the voltage difference across capacitors on the direct current side and the actual value of the voltage difference across capacitors on the direct current side>0, designing the switching sequence as follows: [OON]-[OOO]-[OPO]-[NPN]-[OPO]-[OOO]-[OON];

when the reference voltage vector is located in an outer region of the space vector diagram in the sector 3, designing the switching sequence as follows: [NOO]-[NPP]-[NPN]-[OPO]-[NPN]-[NPP]-[NOO];

when the reference voltage vector is located in an inner region of the space vector diagram in the sector 3, and a difference between the set value of the voltage difference across capacitors on the direct current side and the actual value of the voltage difference across capacitors on the direct current side≤0, designing the switching sequence as follows: [NOO]-[NPP]-[OPO]-[OOO]-[OPO]-[NPP]-[NOO]; and when the reference voltage vector is located in an inner region of the space vector diagram in the sector 3, and a difference between the set value of the voltage difference across capacitors on the direct current side and the actual value of the voltage difference across capacitors on the direct current side>0, designing the switching sequence as follows: [NOO]-[OOO]-[OPO]-[NNP]-[OPO]-[OOO]-[NOO].

7. The method for cooperatively suppressing the common-mode voltage and current harmonics of the coupled three-level inverter according to claim 6, wherein the designing a switching sequence based on the sector and the region in which the reference voltage vector is located, the set value of the voltage difference across capacitors on the direct current side, and the actual value of the capacitor difference on the direct current side, further comprises:

when the reference voltage vector is located in an outer region of the space vector diagram in the sector 4, designing the switching sequence as follows: [NOO]-[NPP]-[NNP]-[OOP]-[NNP]-[NPP]-[NOO];

when the reference voltage vector is located in an inner region of the space vector diagram in the sector 4, and a difference between the set value of the voltage difference across capacitors on the direct current side and the actual value of the voltage difference across capacitors on the direct current side≤0, designing the switching sequence as follows: [NOO]-[NPP]-[OOP]-[OOO]-[OOP]-[NPP]-[NOO];

when the reference voltage vector is located in an inner region of the space vector diagram in the sector 4, and a difference between the set value of the voltage difference across capacitors on the direct current side and the actual value of the voltage difference across capacitors on the direct current side>0, designing the switching sequence as follows: [NOO]-[OOO]-[OOP]-[NNP]-[OOP]-[OOO]-[NOO];

when the reference voltage vector is located in an outer region of the space vector diagram in the sector 5, designing the switching sequence as follows: [ONO]-[PNP]-[NNP]-[OOP]-[NNP]-[PNP]-[ONO];

when the reference voltage vector is located in an inner region of the space vector diagram in the sector 5, and a difference between the set value of the voltage difference across capacitors on the direct current side and the actual value of the voltage difference across capacitors on the direct current side≤0, designing the switching sequence as follows: [ONO]-[PNP]-[OOP]-[OOO]-[OOP]-[PNP]-[ONO];

when the reference voltage vector is located in an inner region of the space vector diagram in the sector 5, and a difference between the set value of the voltage difference across capacitors on the direct current side and the actual value of the voltage difference across capacitors on the direct current side>0, designing the switching sequence as follows: [ONO]-[OOO]-[OOP]-[OOP]-[OPO]-[OOO]-[ONO];

when the reference voltage vector is located in an outer region of the space vector diagram in the sector 6, designing the switching sequence as follows: [ONO]-[PNP]-[PNN]-[POO]-[PNN]-[PNP]-[ONO];

when the reference voltage vector is located in an inner region of the space vector diagram in the sector 6, and a difference between the set value of the voltage difference across capacitors on the direct current side and the actual value of the voltage difference across capacitors on the direct current side≤0, designing the switching sequence as follows: [ONO]-[PNP]-[POO]-[OOO]-[POO]-[PNP]-[ONO]; and when the reference voltage vector is located in an inner region of the space vector diagram in the sector 6, and a difference between the set value of the voltage difference across capacitors on the direct current side and the actual value of the voltage difference across capacitors on the direct current side>0, designing the switching sequence as follows: [ONO]-[OOO]-[POO]-[PNN]-[POO]-[OOO]-[ONO].

8. A system for cooperatively suppressing a common-mode voltage and current harmonics of a coupled three-level inverter, comprising:

a space vector diagram being divided into 6 sectors: a sector 1 to a sector 6, and each sector being further divided into two small regions, namely, a region A and a region B; a boundary between the region A and the region B being a connection line of two small vectors, an inner side of the end point connection line of the two small vectors indicating the region B, and an outer side being the region A;

a sector determining module, configured to determine, based on an amplitude and a phase angle of a reference voltage vector, a sector and a region in which the reference voltage vector is located;

a basic voltage vector selection module, configured to select, based on the sector and the region in which the reference voltage vector is located, a set value of a voltage difference across capacitors on a direct current side, and an actual value of the voltage difference across capacitors on the direct current side, basic voltage vectors to synthesize the reference voltage vector; wherein, basic voltage vectors in the sector 1 comprising a small vector $V_{S1}$ POO, a small vector $V_{S2}$ OON, a large vector $V_{L1}$ PNN, a large vector $V_{L2}$ PPN, and a zero vector $V_Z$ OOO, and an expression of each basic voltage vector being as follows:

$$\begin{cases} V_{S1} = \frac{1+\varphi}{3} V_{dc} \cdot e^{j0} \\ V_{S2} = \frac{1+\varphi}{3} V_{dc} \cdot e^{j\frac{\pi}{3}} \\ V_{L1} = \frac{2}{3} V_{dc} \cdot e^{j0} \\ V_{L2} = \frac{2}{3} V_{dc} \cdot e^{j\frac{\pi}{3}} \\ V_Z = 0 \end{cases} ;$$

wherein, $V_{dc}$ indicates a sum of two capacitor voltages on the direct current side, and when the reference voltage vector is located in the region A of each sector, four nearest basic voltage vectors, comprising two small vectors and two large vectors $V_{S1}$, $V_{S2}$, $V_{L1}$, and $V_{L2}$, are used to synthesize the reference voltage vector; when the reference voltage vector is located in the region B of each sector, separate control of a capacitor voltage on the direct current side cannot be realized by using the basic voltage vectors selected according to a nearest three-vector principle, the reference voltage vectors are synthesized into a large vector, to generate a new degree of control freedom for separate control of the capacitor voltage on the direct current side, and specifically, when the set value $V_{diff}^*$ of the voltage difference across capacitors on the direct current side is less than or equal to the actual value $V_{diff}$ of the voltage difference across capacitors on the direct current side, the large vector $V_{L2}$, the small vectors $V_{S1}$ and $V_{S2}$, and the zero vector $V_Z$ are selected to synthesize the reference voltage vector; when $V_{diff}^*$ is greater than $V_{diff}$, the large vector PPN is replaced with the large vector PNN, and the reference voltage vector is obtained according to the same calculation steps; and when the reference voltage vector is located in another sector, the basic voltage vectors are selected according to the foregoing steps;

a basic voltage vector duty cycle calculation module, configured to write a volt-second balance equation based on the selected basic voltage vectors, and calculating duty cycles of the basic voltage vectors by using an indirect method;

a capacitor voltage separate control module, configured to update the duty cycles of the basic voltage vectors based on the sector and the region in which the reference voltage vector is located, the set value of the voltage difference across capacitors on the direct current side, and the actual value of the voltage difference across capacitors on the direct current side, to realize separate control of the capacitor voltage; and a drive signal generation module, configured to design a switching sequence based on the sector and the region in which the reference voltage vector is located, the set value of the voltage difference across capacitors on the direct current side, and the actual value of the capacitor difference on the direct current side, and convert the switching sequence into a PWM drive signal of a power switch, to control the coupled three-level inverter to operate.

9. A non-transitory computer-readable storage medium, storing a computer program thereon, and when the program is executed by a processor, implementing steps of the method for cooperatively suppressing the common-mode voltage and current harmonics of the coupled three-level inverter according to claim 1.

10. A computer device, comprising a memory, a processor, and a computer program stored in the memory and capable of running on the processor, wherein when the processor executes the program, implementing steps of the method for cooperatively suppressing the common-mode voltage and current harmonics of the coupled three-level inverter according to claim 1.

* * * * *